US009818424B2

(12) United States Patent
Neoran et al.

(10) Patent No.: US 9,818,424 B2
(45) Date of Patent: Nov. 14, 2017

(54) METHOD AND APPARATUS FOR SUPPRESSION OF UNWANTED AUDIO SIGNALS

(71) Applicant: WAVES AUDIO LTD., Tel Aviv (IL)

(72) Inventors: Itai Neoran, Beit-Hananya (IL); Shmuel Nedjar, Modi' in (IL); Roy Yam, Ramat Gan (IL)

(73) Assignee: WAVES AUDIO LTD., Tel Aviv (IL)

( * ) Notice: Subject to any disclaimer, the term of this patent is extended or adjusted under 35 U.S.C. 154(b) by 81 days.

(21) Appl. No.: 14/889,203

(22) PCT Filed: May 5, 2014

(86) PCT No.: PCT/IL2014/050407
§ 371 (c)(1),
(2) Date: Nov. 5, 2015

(87) PCT Pub. No.: WO2014/181330
PCT Pub. Date: Nov. 13, 2014

(65) Prior Publication Data
US 2016/0086618 A1 Mar. 24, 2016

(30) Foreign Application Priority Data
May 6, 2013 (IL) .......................................... 226179

(51) Int. Cl.
*G10L 21/0208* (2013.01)
*G10L 21/0264* (2013.01)
(Continued)

(52) U.S. Cl.
CPC ...... *G10L 21/0208* (2013.01); *G10L 21/0224* (2013.01); *G10L 21/0232* (2013.01);
(Continued)

(58) Field of Classification Search
CPC ....... G10L 21/0208; G10L 2021/02082; G10L 21/0264; G10L 21/034; G10L 21/057;
(Continued)

(56) References Cited

U.S. PATENT DOCUMENTS

| 3,500,000 A | 3/1970 | Kelly, Jr. |
| 4,912,758 A * | 3/1990 | Arbel .................... H04M 9/082 |
| | | 379/388.02 |

(Continued)

OTHER PUBLICATIONS

Chinabonia, R. et al "Adaptive algorithms for acoustic echo cancellation in speech processing". KL University, Guntur, Ap, India.7 (1) 38-42 (2011).

(Continued)

*Primary Examiner* — Eric Yen
(74) *Attorney, Agent, or Firm* — Browdy and Neimark, PLLC

(57) ABSTRACT

A method, and one or more non-transitory computer-readable media storing instructions, and a device for removal of unwanted components in an audio signal, the device comprising a processor, coupled to memory, configured to receive reference and processed inputs into memory where the processed input is a result of a reduction process of unwanted components of the audio signal, estimate envelope values for processed and reference inputs at a plurality of time and frequency instances, for each time and frequency instance: compute a first gain in relation to a ratio of the estimated envelope value of the processed input to the estimated envelope value of the reference input, apply a nonlinear process to said first gain to produce a second gain, compute an output gain as the ratio between second gain and first gain and, apply the output gain to processed input, thereby producing a filtered output with unwanted components suppressed.

57 Claims, 12 Drawing Sheets

(51) Int. Cl.
*G10L 21/0224* (2013.01)
*G10L 21/0232* (2013.01)
*H04M 9/08* (2006.01)

(52) U.S. Cl.
CPC ............ *G10L 21/0264* (2013.01); *H04M 9/08* (2013.01); *H04M 9/082* (2013.01); *G10L 2021/02082* (2013.01)

(58) Field of Classification Search
CPC ......... G10L 25/03; G10L 25/18; G10L 25/24; G10L 21/18
See application file for complete search history.

(56) References Cited

U.S. PATENT DOCUMENTS

| | | | | |
|---|---|---|---|---|
| 5,127,054 | A * | 6/1992 | Hong | H04B 1/667 704/266 |
| 6,088,668 | A | 7/2000 | Zack | |
| 6,317,709 | B1 | 11/2001 | Zack | |
| 6,629,068 | B1 * | 9/2003 | Horos | G10L 19/26 704/205 |
| 6,757,395 | B1 * | 6/2004 | Fang | G10L 21/0208 381/94.3 |
| 7,184,954 | B1 * | 2/2007 | Jacobs | G10L 19/005 704/226 |
| 2003/0195745 | A1 * | 10/2003 | Zinser, Jr. | H04W 88/181 704/219 |
| 2008/0027718 | A1 * | 1/2008 | Krishnan | G10L 21/038 704/211 |
| 2008/0027733 | A1 * | 1/2008 | Oshikiri | G10L 21/038 704/500 |
| 2009/0238373 | A1 * | 9/2009 | Klein | H04M 9/082 381/66 |
| 2011/0081026 | A1 | 4/2011 | Ramakrishnan et al. | |
| 2011/0096942 | A1 | 4/2011 | Thyssen | |
| 2011/0144779 | A1 | 6/2011 | Janse et al. | |
| 2013/0339038 | A1 * | 12/2013 | Norvell | G10L 19/083 704/500 |

OTHER PUBLICATIONS

Allen, J. B. "Short term spectral analysis, synthesis, and modification by discrete Fourier transform". In IEEE Trans. on Acoust., Speech, and Sig. Proc. (4) 21-24 (1997).

Stoica, P. et al "Introduction to spectral analysis" Upper Saddle River: Prentice hall, chapter 5: 207-262 (1997).

Van et al "Beamforming: a versatile approach to spatial filtering". IEEE assp magazine, 5(2), 4-24. (1988).

Nakatani et al "Blind dereverberation of single channel speech signal based on harmonic structure". In Acoustics, Speech, and Signal Processing, 2003. Proceedings.(ICASSP'03). 2003 IEEE International Conference on 1 : I-92. IEEE. (Apr. 2003).

Crochiere R. E. "A weighted overlap-add method of short-time Fourier analysis/synthesis". Acoustics, Speech and Signal Processing, IEEE Transactions on, 28(1), 99-102. (1980).

Goldin, A., "Challenges of Acoustic Echo Cancellation in low cost applications". In 118th Convention of Audio Engineering Society (Barcelona, 2005).

Wikipedia. "Dynamic range compression" Http://en.wikipedia.org/wiki/dynamic_range_compression (May 3, 2013).

* cited by examiner

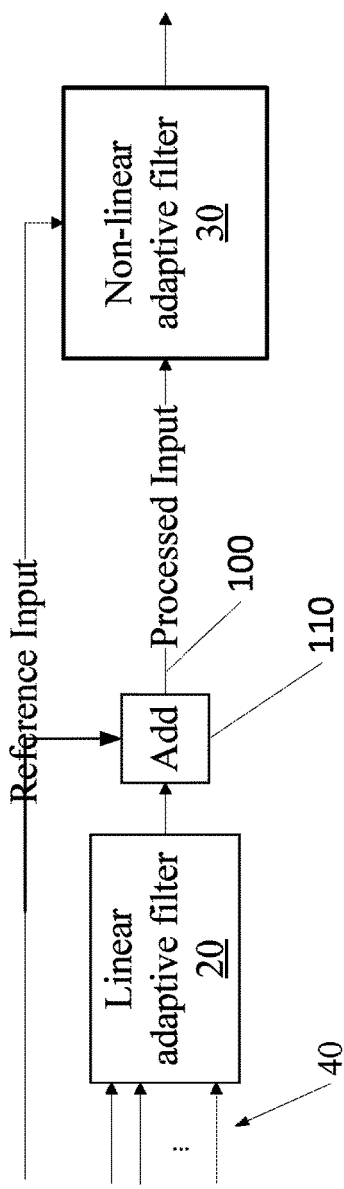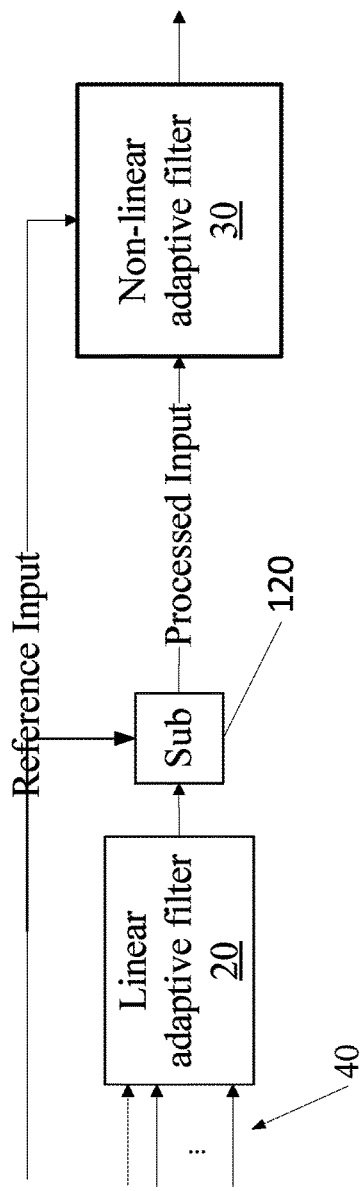
Figure 1B
Figure 1C

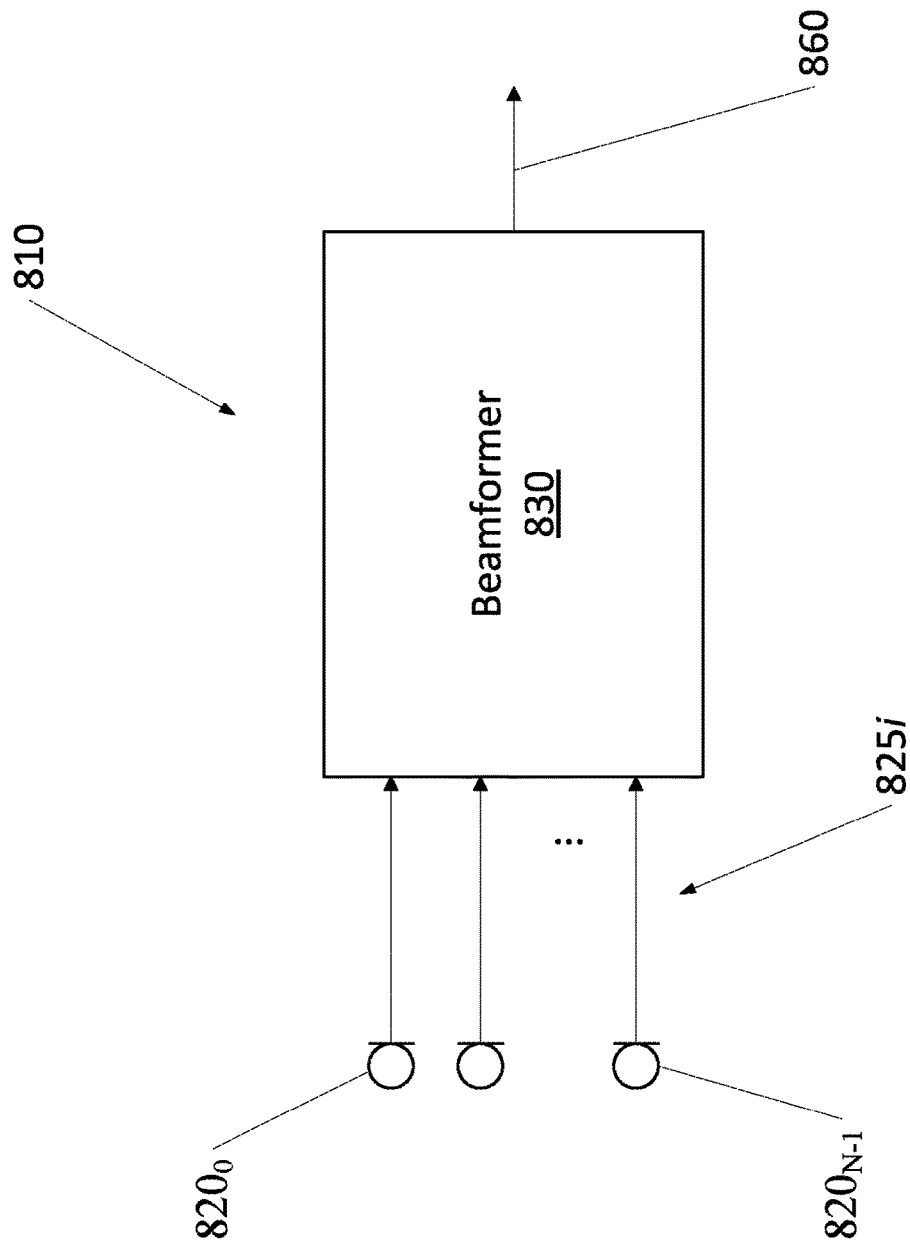

METHOD AND APPARATUS FOR SUPPRESSION OF UNWANTED AUDIO SIGNALS

FIELD OF THE INVENTION

The present invention relates in general to audio signal processing. In particular the present invention relates to audio signal processing for suppression of noise, acoustic echoes or any other unwanted signal.

BACKGROUND

It is common in the art of audio signal processing to use adaptive filters to suppress unwanted additive signals, such as noise or echo, from the audio signals that contain desired information such as speech, music and/or other desired information. Such adaptive filters use at least one audio input signal.

Some methods for suppression of unwanted signals may include noise reduction, microphone beam forming and echo cancellation technologies. In some examples, adaptive linear filters can be used to model an unknown linear system that may comprise acoustic or electronic signals. An adaptive filter may be able, in some examples, to estimate the system it models. Adaptive filters are however, in some examples, subject to inaccuracies and performance limitations, due, in part, to a nonlinearity nature of the system.

Practically, most systems are not linear, due to, among other reasons, unwanted and unknown signals. Unwanted signals can include, for example, noise or echo that is added intentionally and/or unintentionally to a desired signal. This addition of uncorrelated noise or echo to the main and/or desired audio signal can be highly nonlinear within the system to which the filter is applied.

In some examples, an Acoustic echo canceller can be used to estimate the acoustic echo leak between, for example, a mechanical speaker and a microphone of a near-end user (e.g., a telephonic device). The echo leak can be described as an unwanted audio signal that was added to a main audio signal. The main audio signal can be, for example, a voice of a human user. The estimated echo leak can be then subtracted from the main audio input signal in order to cancel the real echo leak.

Other causes of nonlinearity within an audio system can include, for example, harmonic distortion. A harmonic distortion can stem from loudspeakers or microphones distortions, or from other sources.

In some examples, a linear system may not be stationary, for example, due to change in the acoustical environment, resulting in a nonlinear behavior of the adaptive filter.

Designers of noise reduction systems and echo cancellers may, in some examples, seek nonlinear solutions that could improve the performance of one or more adaptive linear filters. For example a linear adaptive filter in echo-cancellers can be followed by a nonlinear residual echo canceller. Similarly, microphone beam-forming algorithms can be enhanced by a nonlinear noise gating operation.

GENERAL DESCRIPTION

According to one aspect of the presently disclosed subject matter there is provided a device for removal of unwanted components in an audio signal, the device comprising a processor operatively coupled to a memory, said processor configured to receive a reference input and a processed input into the memory, where said processed input is a result of at least a reduction process of unwanted components of the audio signal, estimate envelope values for the processed input and for the reference input at a plurality of time and frequency instances, for each said time and frequency instance: compute a first gain in relation to a ratio of the estimated envelope value of the processed input to the estimated envelope value of the reference input, apply a nonlinear process to said first gain to produce a second gain, compute an output gain as the ratio between said second gain and said first gain and, apply said output gain to the processed input, and thereby producing a filtered output with unwanted components suppressed.

Furthermore, in accordance with some embodiments of the present invention, wherein said processed input and said reference input are in a time domain representation and said processor is configured to convert said processed input and said reference input into a time-frequency representation prior to said estimation of envelope values, and to convert said filtered output from the time-frequency representation into the time domain representation.

Furthermore, in accordance with some embodiments of the present invention, the device wherein said processed input and said reference input are converted into a time-frequency representation prior to being received by the processor.

Furthermore, in accordance with some embodiments of the present invention, the processor further configured to receive the processed input where it is a result of a noise suppression process that was applied to an audio signal.

Furthermore, in accordance with some embodiments of the present invention, the processor further configured to receive the processed input where it is a result of a cancellation process of unwanted parts on an audio signal.

Furthermore, in accordance with some embodiments of the present invention, the processor further configured to compute the ratio of the estimated envelope value of the processed input to the estimated envelope value of the reference input with a regularization factor.

Furthermore, in accordance with some embodiments of the present invention, the device wherein said nonlinear process applied on said first gain to produce said second gain is an expansion operation.

Furthermore, in accordance with some embodiments of the present invention, the processor further configured to compute the second gain as an expansion of said first gain if said first gain is less than 1, and compute the second gain as equal to said first gain if said first gain is greater or equal to 1.

Furthermore, in accordance with some embodiments of the present invention, the processor further configured to compute the first gain proportional to the ratio of the estimated envelope value of the processed input to the estimated envelope value of the reference input, if said estimated envelope value of the processed input is greater than said estimated envelope value of the reference input; otherwise the first gain is set to one.

Furthermore, in accordance with some embodiments of the present invention, the processor further configured to use inputs and outputs that are digitally sampled signals.

Furthermore, in accordance with some embodiments of the present invention, the processor further configured to smooth the output gain in time domain or in frequency domain or in both time and frequency domains.

Furthermore, in accordance with some embodiments of the present invention, the processor further configured to receive additional parameters for use in said nonlinear processing.

Furthermore, in accordance with some embodiments of the present invention, the processor further configured to receive said parameters externally.

Furthermore, in accordance with some embodiments of the present invention, the processor further configured to receive said parameters from a user interface.

Furthermore, in accordance with some embodiments of the present invention, the processor further configured to receive said parameters from an additional module configured to calculate said parameters.

Furthermore, in accordance with some embodiments of the present invention, the device wherein further comprising a filter-bank module configured for decomposing said processed in put and said reference input into frequency bands and wherein said first gain, said second gain, and said output gain are computed and applied on said decomposed process input for each said frequency band.

Furthermore, in accordance with some embodiments of the present invention, the processor further configured to receive said reference input as a near-end audio input signal of an echo canceller, and said processed input as audio output of said echo canceller.

Furthermore, in accordance with some embodiments of the present invention, the processor further configured to receive said reference input from one or more audio inputs to a beam former and said processed input from the output of said beam former.

Furthermore, in accordance with some embodiments of the present invention, the processor further configured to receive said reference input from one or more audio inputs to a de-reverberation module and said processed input from the output of said de-reverberation module.

There is further provided, in accordance with some embodiments of the present invention a method of removal of unwanted components in an audio signal, the method comprising a processor operatively coupled to a memory, said processor configured to receive a reference input and a processed input into the memory, where said processed input is a result of at least a reduction process of unwanted components of the audio signal, estimate envelope values for the processed input and for the reference input at a plurality of time and frequency instances, for each said time and frequency instance: compute a first gain in relation to a ratio of the estimated envelope value of the processed input to the estimated envelope value of the reference input, apply a nonlinear process to said first gain to produce a second gain, compute an output gain as the ratio between said second gain and said first gain and, apply said output gain to the processed input; and thereby producing a filtered output with unwanted components suppressed.

Furthermore, in accordance with some embodiments of the present invention, the method wherein said processed input and said reference input are in a time domain representation and said processor is configured to convert said processed input and said reference input into a time-frequency representation prior to said estimation of envelope values, and to convert said filtered output from the time-frequency representation into the time domain representation.

Furthermore, in accordance with some embodiments of the present invention, the method wherein said processed input and said reference input are converted into a time-frequency representation prior to being received by the processor.

Furthermore, in accordance with some embodiments of the present invention, the method wherein the processed input results from a noise suppression process that was applied to an audio signal.

Furthermore, in accordance with some embodiments of the present invention, the method wherein the processed input results from a cancellation process of unwanted parts on an audio signal.

Furthermore, in accordance with some embodiments of the present invention, the method wherein a computation of the ratio of the estimated envelope value of the processed input to the estimated envelope value of the reference input comprises a regularization factor.

Furthermore, in accordance with some embodiments of the present invention, the method wherein said nonlinear process applied on said first gain is an expansion operation.

Furthermore, in accordance with some embodiments of the present invention, the wherein the second gain is computed as an expansion of said first gain if said first gain is less than 1, and said second gain is computed as equal to said first gain if said first gain is greater or equal to 1.

Furthermore, in accordance with some embodiments of the present invention, the method wherein the first gain is computed to be proportional to the ratio of the estimated envelope value of the processed input to the estimated envelope value of the reference input, if said estimated envelope value of the processed input is greater than said estimated envelope value of the reference input; otherwise the first gain is set to one.

Furthermore, in accordance with some embodiments of the present invention, the method wherein said inputs and outputs are digitally sampled signals.

Furthermore, in accordance with some embodiments of the present invention, the method wherein the processor is configured to smooth the output gain in time domain or in frequency domain or in both time and frequency domains.

Furthermore, in accordance with some embodiments of the present invention, the method wherein applying of a nonlinear processing comprises receiving additional parameters for use in said nonlinear processing.

Furthermore, in accordance with some embodiments of the present invention, the method wherein said parameters are received externally.

Furthermore, in accordance with some embodiments of the present invention, the method wherein said parameters are received from a user interface.

Furthermore, in accordance with some embodiments of the present invention, the method wherein said parameters are received from an additional module configured to calculate said parameters with relation to the said method.

Furthermore, in accordance with some embodiments of the present invention, the method further comprising a filter-bank module configured for decomposing said processed input and said reference input into frequency bands and wherein said first gain, said second gain, and said output gain are computed and applied on said decomposed process input for each said frequency band.

Furthermore, in accordance with some embodiments of the present invention, the method wherein said reference input is a near-end audio input signal of an echo canceller, and said processed input is an audio output of said echo canceller.

Furthermore, in accordance with some embodiments of the present invention, the method wherein said reference input is from one or more audio inputs to a beam former and said processed input is one or more outputs of said beam former.

Furthermore, in accordance with some embodiments of the present invention, the method wherein said reference input is from one or more audio inputs to a de-reverberation module and said processed input is the output of said de-reverberation module.

There is further provided, in accordance with some embodiments of the present invention, one or more non-transitory computer-readable media storing computer-readable instructions for internally generating a differential correction, that when executed by a processor cause the processor to receive a reference input and a processed input into the memory, where said processed input is a result of at least a reduction process of unwanted components of the audio signal, estimate envelope values for the processed input and for the reference input at a plurality of time and frequency instances, for each said time and frequency instance: compute a first gain in relation to a ratio of the estimated envelope value of the processed input to the estimated envelope value of the reference input, apply a nonlinear process to said first gain to produce a second gain, compute an output gain as the ratio between said second gain and said first gain, and apply said output gain to the processed input, and thereby producing a filtered output with unwanted components suppressed.

Furthermore, in accordance with some embodiments of the present invention, the one or more non-transitory computer-readable media storing computer-readable instructions further causing the processor to convert said processed input and said reference input from a time domain representation into a time-frequency representation prior to said estimation of envelope values, and to convert said filtered output from the time-frequency representation into the time domain representation.

Furthermore, in accordance with some embodiments of the present invention, the one or more non-transitory computer-readable media storing computer-readable instructions wherein said processed input and reference input are converted into a time-frequency representation prior to being received by the processor.

Furthermore, in accordance with some embodiments of the present invention, the one or more non-transitory computer-readable media storing computer-readable instructions further causing the processor to receive the processed input where it is a result of a noise suppression process that was applied to an audio signal.

Furthermore, in accordance with some embodiments of the present invention, the one or more non-transitory computer-readable media storing computer-readable instructions further causing the processor to receive the processed input where it is a result of a cancellation process of unwanted parts on an audio signal.

Furthermore, in accordance with some embodiments of the present invention, the one or more non-transitory computer-readable media storing computer-readable instructions further causing the processor to compute the ratio of the estimated envelope value of the processed input to the estimated envelope value of the reference input with a regularization factor.

Furthermore, in accordance with some embodiments of the present invention, the one or more non-transitory computer-readable media storing computer-readable instructions wherein said nonlinear process applied on said first gain to produce said second gain is an expansion operation.

Furthermore, in accordance with some embodiments of the present invention, the one or more non-transitory computer-readable media storing computer-readable instructions further causing the processor to compute the second gain as an expansion of said first gain if said first gain is less than 1, and compute the second gain as equal to said first gain if said first gain is greater or equal to 1.

Furthermore, in accordance with some embodiments of the present invention, the one or more non-transitory computer-readable media storing computer-readable instructions further causing the processor to compute the first gain proportional to the ratio of the estimated envelope value of the processed input to the estimated envelope value of the reference input, if said estimated envelope value of the reference input is greater than said estimated envelope value of the reference input; otherwise the first gain is set to one.

Furthermore, in accordance with some embodiments of the present invention, the one or more non-transitory computer-readable media storing computer-readable instructions further causing the processor to use inputs and outputs that are digitally sampled signals.

Furthermore, in accordance with some embodiments of the present invention, the one or more non-transitory computer-readable media storing computer-readable instructions further causing the processor to smooth the output gain in time domain or in frequency domain or in both time and frequency domains.

Furthermore, in accordance with some embodiments of the present invention, the one or more non-transitory computer-readable media storing computer-readable instructions further causing the processor to receive additional parameters for use in said nonlinear processing.

Furthermore, in accordance with some embodiments of the present invention, the one or more non-transitory computer-readable media storing computer-readable instructions further causing the processor to receive said parameters externally.

Furthermore, in accordance with some embodiments of the present invention, the one or more non-transitory computer-readable media storing computer-readable instructions further causing the processor to receive said parameters from a user interface.

Furthermore, in accordance with some embodiments of the present invention, the one or more non-transitory computer-readable media storing computer-readable instructions further causing the processor to receive said parameters from an additional module configured to calculate said parameters.

Furthermore, in accordance with some embodiments of the present invention, the one or more non-transitory computer-readable media storing computer-readable instructions further causing the processor to use a filter-bank module configured for decomposing said processed input and said reference input into frequency bands and wherein said first gain, said second gain, and said output gain are computed and applied on said decomposed process input for each said frequency band.

Furthermore, in accordance with some embodiments of the present invention, the one or more non-transitory computer-readable media storing computer-readable instructions further causing the processor to receive said reference input as a near-end audio input signal of an echo canceller, and said processed input as audio output of said echo canceller.

Furthermore, in accordance with some embodiments of the present invention, the one or more non-transitory computer-readable media storing computer-readable instructions further causing the processor to receive said reference input from one or more audio inputs to a beam former and said processed input from the output of said beam former.

Furthermore, in accordance with some embodiments of the present invention, the one or more non-transitory computer-readable media storing computer-readable instructions further causing the processor to receive said reference input from one of the audio inputs to a de-reverberation module and said processed input from the output of said de-reverberation module.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 1B is a schematic functional diagram of a system including a nonlinear adaptive filter according to an example, in accordance with the presently disclosed subject matter.

FIG. 1C is a schematic functional diagram of a system including a nonlinear adaptive filter according to an example, in accordance with the presently disclosed subject matter;

FIG. 6A is a functional block representation of a beam forming system, according to an example in accordance with the presently disclosed subject matter;

DETAILED DESCRIPTION

Figure 1A:
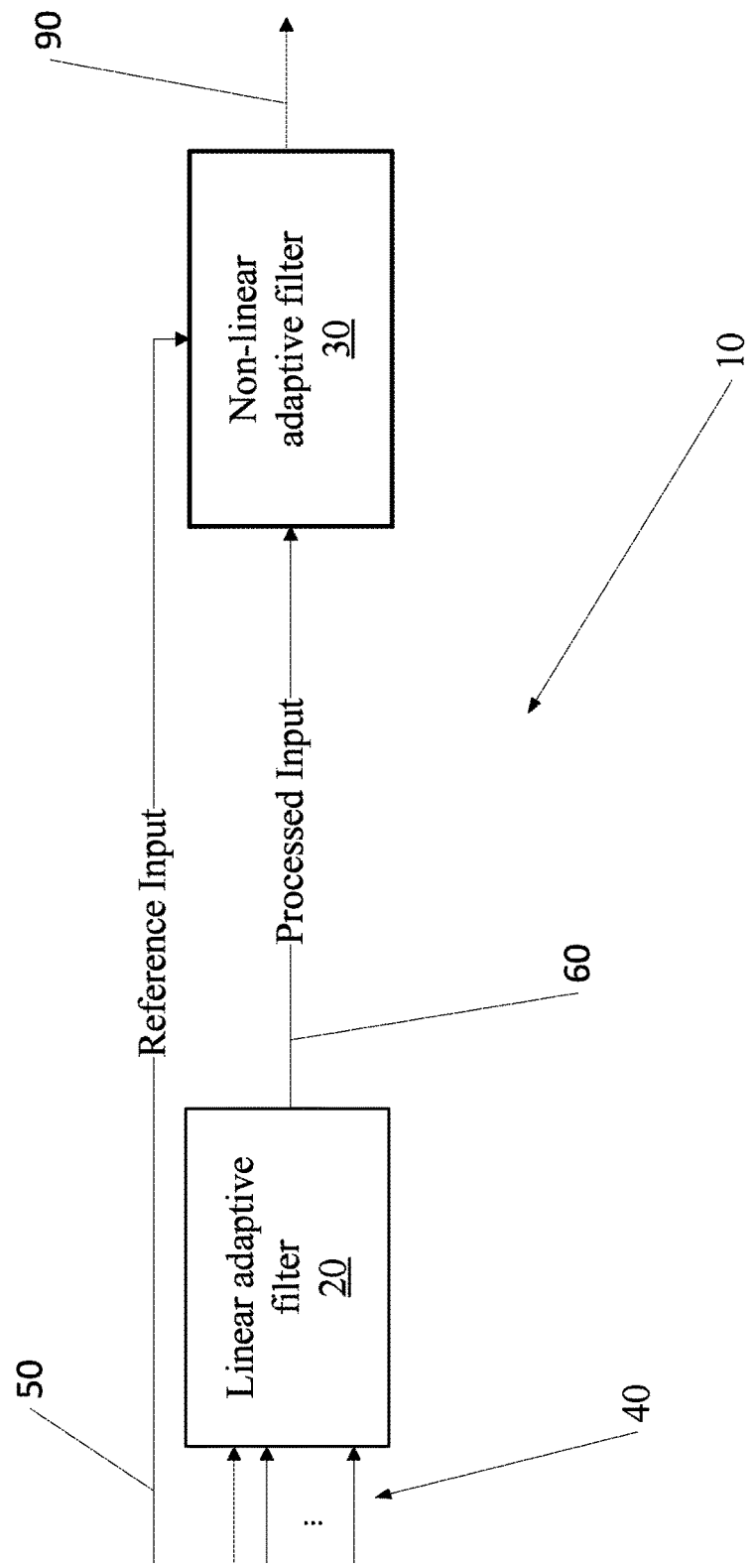
FIG. 1A is a schematic functional diagram of a system including a nonlinear adaptive filter according to an example, in accordance with the presently disclosed subject matter.

In the following detailed description, numerous specific details are set forth in order to provide a thorough understanding of the systems methods and apparatus. However, it will be understood by those skilled in the art that the present systems, methods and apparatus can be practiced without some or all of these specific details. In other instances, well-known methods, procedures, and components have not been described in detail so as not to obscure the present methods and apparatus.

Although the examples disclosed and discussed herein are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices. As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

The term "computer", "computer processor", "processor" or the like should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof. Said electronic device with data processing capabilities may be used for one or more operations in filtering a signal. Said electronic device with data processing capabilities may be coupled directly and/or indirectly to a source of said signal. Said electronic device with data processing capabilities can be connected via a wired and/or wireless connection to other components of systems described below. The processing can be applied to audio and/or other signals, including transitory and non-transitory signals.

Examples of the present invention can include apparatuses for performing the operations described herein. Such apparatuses can be specially constructed for the desired purposes, or can comprise computers or processors selectively activated or reconfigured by a computer program stored in the computers. Such computer programs can be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, solid state memory or any other type of media suitable for storing electronic instructions.

The operations in accordance with the teachings herein can be performed by a computer specially constructed for the desired purposes or by a general purpose computer specially configured for the desired purpose by a computer program stored in a computer readable storage medium.

It is appreciated that certain features of the presently disclosed subject matter, which are, for clarity, described in the context of separate embodiments, can also be provided in combination in a single embodiment. Conversely, various features of the presently disclosed subject matter, which are, for brevity, described in the context of a single embodiment, can also be provided separately or in any suitable sub-combination.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present presently disclosed subject matter.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The term $input_0$ is mentioned herein and marked in some figures. $Input_0$ can be one channel being selected from a plurality of N inputs. Input number i may be denoted as $input_i$, were i can be any discrete number between 0 to N−1. A channel selected as $input_0$ can be selected arbitrarily, by the quality of the channel, or by other selection processes.

The term audio expansion usually means to expand the dynamic range of an audio signal. The term expansion mentioned herein as an operation performed on a gain can mean an instance wherein there is further attenuation e.g., making the value of the gain smaller.

The following texts are incorporated by reference in their entirety, for any and all purposes, in the present application.

U.S. Pat. No. 3,500,000 entitled "Self-Adaptive Echo Canceller" to John L. Kelly Jr which describes the suppression of echoes in communication channels and more particularly to the effective suppressing of echoes in a two-way telephone circuit of extremely long length such as, for example, a circuit completed by way of a satellite repeater in orbit about the earth. Its principal object is to afford improved protection against echoes irrespective of the length of the transmission circuits in use "Adaptive Algorithms for Acoustic Echo Cancellation In Speech Processing", Radhika Chinaboina et al, http://www.arpapress.com/VolumesNo17Issue1/IJRRAS_7_1_05.pdf "Challenges of Acoustic Echo Cancellation in Low Cost Applications", Goldin, Budkin, AES convention 118, Spain 2005, which describes challenges of performing effective acoustic echo cancellation in time-delay sensitive applications where the quality of used acoustic components is low, the acoustic design may be pure and the cost of used digital components must be reduces as low as possible. The situation is typical for mass-market applications such as mobile and regular phones, office speakerphones and low cost conferencing systems. Using low cost components in compact enclosures introduces large amount of non-linear distortions into the loudspeaker signal causing pure performance of classical acoustic echo cancellation algorithms.

"Short Term Spectral Analysis, Synthesis, and Modification by Discrete Fourier Transform", Jont B. Allen, Bell Laboratories, Murray Hill, N.J. which describes a theory of short term spectral analysis, synthesis, and modification is presented with an attempt at pointing out certain practical and theoretical questions. The methods discussed here are useful in designing filter banks when the filter bank outputs are to be used for synthesis after multiplicative modifications are made to the spectrum.

"Introduction to Spectral Analysis", chapter 5, Petre Stoica (Upsala University) and Randolph L. Moses (Ohio State University) which describes filter bank models.

U.S. Pat. No. 6,317,709 B1, "Noise suppressor having weighted gain smoothing", to Rafael Zack which describes a noise suppressor is provided which includes a signal to noise ratio (SNR) determiner, a channel gain determiner, a gain smoother and a multiplier. The SNR determiner determines the SNR per channel of the input signal. The channel gain determiner determines a channel gain γch(i) per the ith channel. The gain smoother produces a smoothed gain {overscore (γch+L (i,m))} per the ith channel and the multiplier multiplies each channel of the input signal by its associated smoothed gain {overscore (γch+L (i,m))}.

U.S. Pat. No. 6,351,731 B1, "Adaptive filter featuring spectral gain smoothing and variable noise multiplier for noise reduction, and method therefor", to David V. Anderson, Stephen McGrath and Kwan Truong, which describes an adaptive filter is featuring a speech spectrum estimator receiving as input an estimated spectral magnitude signal for a time frame of the input signal and generating an estimated speech spectral magnitude signal representing estimated spectral magnitude values for speech in a time frame. A spectral gain generator receives as input the estimated spectral magnitude signal and the estimated speech spectral magnitude signal and generates as output an initial spectral gain signal that yields an estimate of speech spectrum in a time frame of the input signal when the initial spectral gain signal is applied to the spectral signal. A spectral gain modifier receives as input the initial spectral gain signal and generates a modified gain signal by limiting a rate of change of the initial spectral gain signal with respect to the spectral gain over a number of previous time frames. The modified gain signal is then applied to the spectral signal, which is then converted to its time domain equivalent. The value of the noise multiplier is larger when a time frame of the input signal contains more noise than speech and is smaller when a time frame of the input signal contains more speech than noise.

U.S. Pat. No. 6,088,668 A, "Noise suppressor having weighted gain smoothing", to Rafael Zack which describes a noise suppressor which includes a signal to noise ratio (SNR) determiner, a channel gain determiner, a gain smoother and a multiplier. The SNR determiner determines the SNR per channel of the input signal. The channel gain determiner determines a channel gain γ.sub.ch (i) per the ith channel. The gain smoother produces a smoothed gain γ.sub.ch (i,m) per the ith channel and the multiplier multiplies each channel of the input signal by its associated smoothed gain γ.sub.ch (i,m).

"A Weighted Overlap-Add Method of Short-Time Fourier Analysis/Synthesis", Crochiere, R. E., Bell Laboratories, Murray Hill, N.J., USA which describes a structure and a simplified interpretation of short-time Fourier synthesis using synthesis windows. This approach can be interpreted as a modification of the overlap-add method where we inverse the Fourier transform and window by the synthesis window prior to overlap-adding. This simplified interpretation results in a more efficient structure for short-time synthesis when a synthesis window is desired. This structure can be used for analysis/synthesis applications which require different analysis and synthesis rates, such as time compression or expansion.

"Dynamic Range Compression", Wikipedia, availbile at http://en.wikipedia.org/wiki/Dynamic_range_compression "Beamforming: A Versatile Approach to Spatial Filtering", Barry D. Van Veen and Kevin M. Buckleywhich describes A beamformer, a processor used in conjunction with an array of sensors to provide a versatile form of spatial filtering. The sensor array collects spatial samples of propagating wave fields, which are processed by the beamformer.

"Blind Dereverberation of Single Channel Speech Signal Based on Harmonic Structure", Tomohiro Nakatani and Masato Miyoshi, which describes a method for dereverberation of speech signals with a single microphone. For applications such as speech recognition, reverberant speech causes serious problems when a distant microphone is used in recording. This is especially severe when the reverberation time exceeds 0.5 of a second. The method uses the fundamental frequency (F0) of target speech as the primary feature for dereverberation. This method initially estimates and harmonic structure of the speech signal and then obtains a dereverberation operator. This operator transforms the reverberant signal to its direct signal based on an inverse filtering operation. Dereverberation is achieved with prior knowledge of neither room acoustics nor the target speech.

FIG. 1A is a schematic functional diagram of a system including a nonlinear adaptive filter according to an example, in accordance with the presently disclosed subject matter.

One principle behind converting an adaptive filter, used for example in cancellation process of unwanted parts or noise suppression, into a nonlinear operation, can be based on the assumption that an adaptive linear filter under inspection converges to its best coefficients or close to its best coefficients, with respect to optimal reduction of noise or echo or any unwanted signal. An unwanted signal can be an objective determination, for example, signal noise. In some examples, the unwanted signal can be wholly and/or partially a subjective determination. In some examples, adaptive linear filters converge better when unwanted signals have low correlations with the desired output signal. Additionally the system may need to be sufficiently stationary, e.g., that the system's statistical properties are changing slowly enough, for the adaptive filter to converge.

In some examples, one or more filters, e.g., adaptive linear filters, can be used to filter an input and provide a processed output within a filtering system 10.

A nonlinear adaptive filter 30 module may be applied to almost any algorithm that includes an adaptive linear filter 20. Linear adaptive filter 20 can have a plurality of inputs 40, in some examples a reference input can be one of the inputs 40 to the linear adaptive filter 20. In some examples, linear adaptive filter 20 has a plurality of inputs, e.g., a first set of inputs 40, and at least one output 60. Non Linear adaptive filter 30 has a reference input 50. Output 60 can be used as a processed input into nonlinear adaptive filter 30, providing for a further filtered output 90. In some examples, another adaptive filter may be used instead and/or in addition to linear adaptive filter 20. In some examples, this another adaptive filter is not linear.

FIG. 1B is a schematic functional diagram of a system including a nonlinear adaptive filter according to an example, in accordance with the presently disclosed subject matter.

FIG. 1B can be similar to FIG. 1A described above, with the exception of differences show. In some examples, FIG. 1B can be a specific case of FIG. 1A described above. In some examples, a output 100, e.g., similar to output 60 described above, can be the output of an optional summation block 110.

In some examples, output 100 can be the result of the error between a desired output and an output similar or the same to the output 60 described.

FIG. 1C is a schematic functional diagram of a system including a nonlinear adaptive filter according to an example, in accordance with the presently disclosed subject matter.

FIG. 1C can be similar to FIG. 1A described above, with the exception of differences show. In some examples, FIG. 1C can be a specific case of FIG. 1A. FIG. 1C can be as described above with reference to FIG. 1B with the exception of differences shown.

FIG. 1C may extract output 100 from an optional subtractive block 120.

Figure 2A:
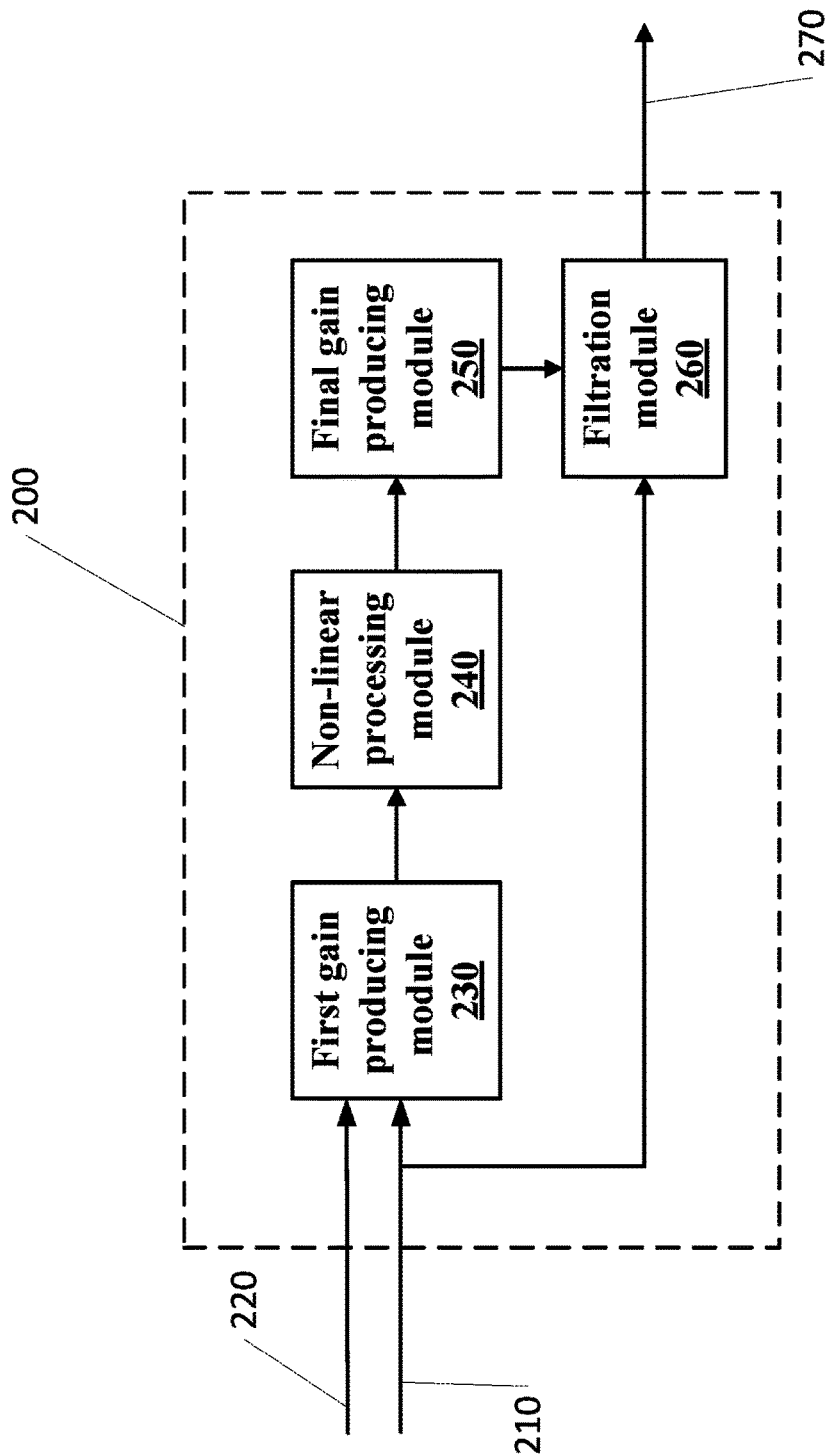
FIG. 2A is a functional block diagram of a nonlinear adaptive filter, according to an example, in accordance with the presently disclosed subject matter.

FIG. 2A is a functional block diagram of a nonlinear adaptive filter, according to an example, in accordance with the presently disclosed subject matter.

A nonlinear adaptive filter system may have a processor and memory. The processor and memory and/or other components are configured to process audio signals and in some examples, filter out unwanted signal and/or noise.

In some examples, a plurality of signals are inputted into a nonlinear adaptive filter system 200. System 200 may include the modules show and/or additional or different modules. System 200 may be a part of a larger system, for example, a signal processing system. In some examples an input signal 210 can be an audio signal. Input signal 210 can be one or more signals, the signals coming from varied sources including, for example, one or a plurality of microphones and/or other devices. Input 210 can be a processed audio signal, for example an audio signal that has been filtered. In some examples, input 210 is the result of a reduction process of unwanted parts in said first audio signal.

A filtering of input 210 can result in a processed input. Filtering of input 210 can be accomplished via a linear adaptive filter, for example, as described above. Other and/or additional processing can also result in a processed input. Filtering of input 210 can be accomplished by a plurality of linear filters. In some examples, audio modules, such as de-reverberation filters, echo cancellers and/or other modules may include filters. Input 210 can be the resulting audio signal from said filters.

A reference input 220 can be an input that is not the result of at least a reduction process of unwanted components of the audio signal.

A first gain producing module 230 can be configured for receiving two or more input signals. Said input signals can be represented in the time-frequency domain and can allow for the analysis of inputs in both the time and frequency domains simultaneously.

The time component of a time-frequency analysis may provide data with regard to how said signal input changes over time. The frequency component of said time-frequency domain allows, in some examples, to indicate how said input signal's energy can be distributed over a range of frequencies. Said time-frequency domain component can also provide data with regard to other parameters of said input signal. In some examples, a transform, for example a Fourier or a complex Fourier Transform, can be used to convert said input signals into a time-frequency domain. Other methods may also be employed to convert said input signals into a time-frequency domain, and/or employed to otherwise convert or modify said input signals.

Gain producing module 230 can be configured to estimate envelopes at each time or time-frequency instance. Gain producing module 230 can compute, for example, a first gain proportional to the approximated ratio between two estimated envelopes, a first estimated envelope for the signal input 210 and a second envelope for the signal represented as reference input 220, at each sampled time or time-frequency instance.

A nonlinear processing module 240 can be configured for applying a nonlinear process on said computed first gain to produce a second gain at each time or time-frequency instance, whereas said second gain can be configured to further reduce said unwanted parts in the said audio signal. In some examples, the second gain can be via a linear process, in some examples, said second gain can be via a non linear process.

A final gain producing module 250 can be configured for computing an output gain, the output gain for example the ratio between said second gain and said first gain, at each time or time-frequency instance.

A filtration module 260 may be configured to apply said output gain, at each time or time-frequency instance, on one of said input signals 210 and/or 220 to produce a desired filtered output signal 270.

Figure 2B:
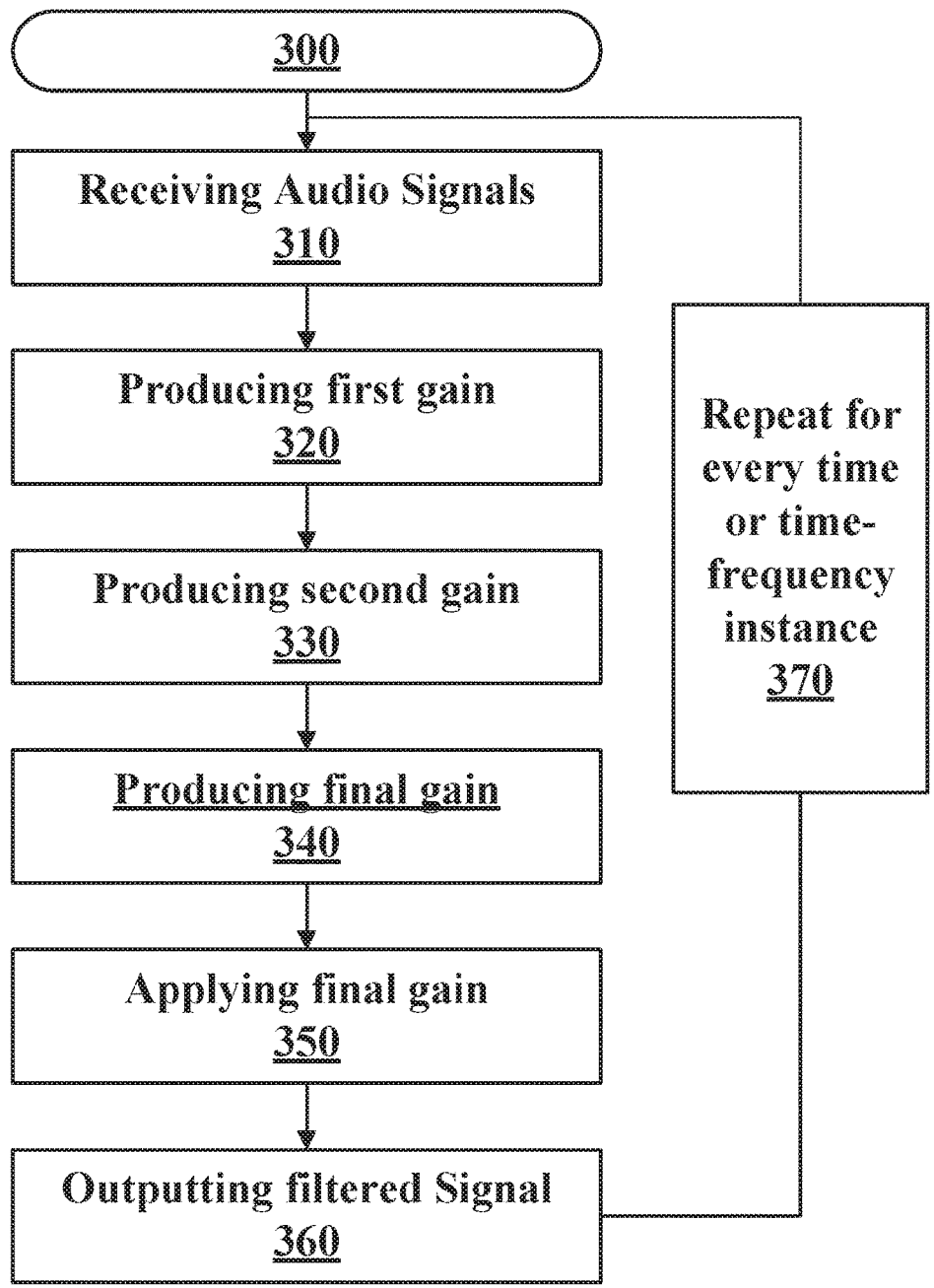
FIG. 2B is a functional flow chart of a nonlinear adaptive filter, according to an example, in accordance with the presently disclosed subject matter.

FIG. 2B is a functional flow chart of a nonlinear adaptive filter, according to an example, in accordance with the presently disclosed subject matter.

In some examples, a nonlinear adaptive filter system, for example, the systems described above, can receive an audio signal comprising one or more processed inputs and one or more reference inputs. In some examples, said nonlinear adaptive filter system can be configured to convert said audio signals into a time-frequency representation. In some examples, a nonlinear adaptive filter system can receive a time-frequency representation (TFR) of one or more reference inputs and of one or more processed inputs, for example said processed inputs and reference inputs described above. The conversion of said signals into a time-frequency representation can occur prior to producing a first gain, for example, as described below. In some examples, the conversion of said signals into a time-frequency determination can occur prior to receiving audio signals, the receiving for example, as described below. In some examples, conversion of said signals into a time-frequency determination can occur after receiving audio signals. In some examples, the conversion of said signals into a time-frequency determination can be the result of a process occurring via the nonlinear filter. In some examples the conversion of said signals into a time-frequency determination can occur as a process independent of the nonlinear filter, for example, by a component, module or part of the system described, or another system.

Said one or more processed inputs can be the result of at least a reduction process of unwanted components of the audio signal. The receiving of said signals as represented in box 310. The audio signal may have a prior processing, including said reduction process of unwanted components of the audio signal, history, that can include filtering and other processes, said prior processing history represented by box 300.

A first gain can be produced, for example, via a first gain producing module described above. Said first gain producing module can be configured for receiving said two or more input signals including, for example, said reference signal and said processed signal. This first gain production as represented by box 320.

The production of the first gain via the gain producing module can be configured such that a processor or other module estimates one or more envelopes, e.g., the way that the amplitude of the input signal, for each or more input signals, varies over time. This variation over time may be represented by a sampling for each time or time-frequency instance.

The first gain can be computed such that it can be proportional to the approximated ratio between, for example, two estimated envelopes: a first estimated envelope for the signal input and a second envelope for the reference input, at each sampled time or time-frequency instance.

A second gain can be produced, for example as represented by box 330. In some examples, a nonlinear processing module, for example, as described above, can be configured to apply a nonlinear process on said computed first gain to produce a second gain at each sampled time or time-frequency instance, whereas said second gain can be configured such that it further reduces said unwanted parts in said input signal.

A final gain can be produced, for example, as depicted as box 340. In some examples, a final gain producing module, for example, as described above, can be configured to compute an output gain as the ratio between said second gain and said first gain, at each time or time-frequency instance.

The final gain can be applied, at each time or time-frequency instance, on the processed input and/or reference input, as depicted for examples in box 350. This application of the final gain can be applied, in some examples, by a filtration module, as described above.

A desired filtered output signal can be outputted by one or a plurality of modules, as depicted in box 360. In some examples, a new time or time-frequency instance of said input signals can be processed, as depicted, for example, by arrow 370.

Figure 3:
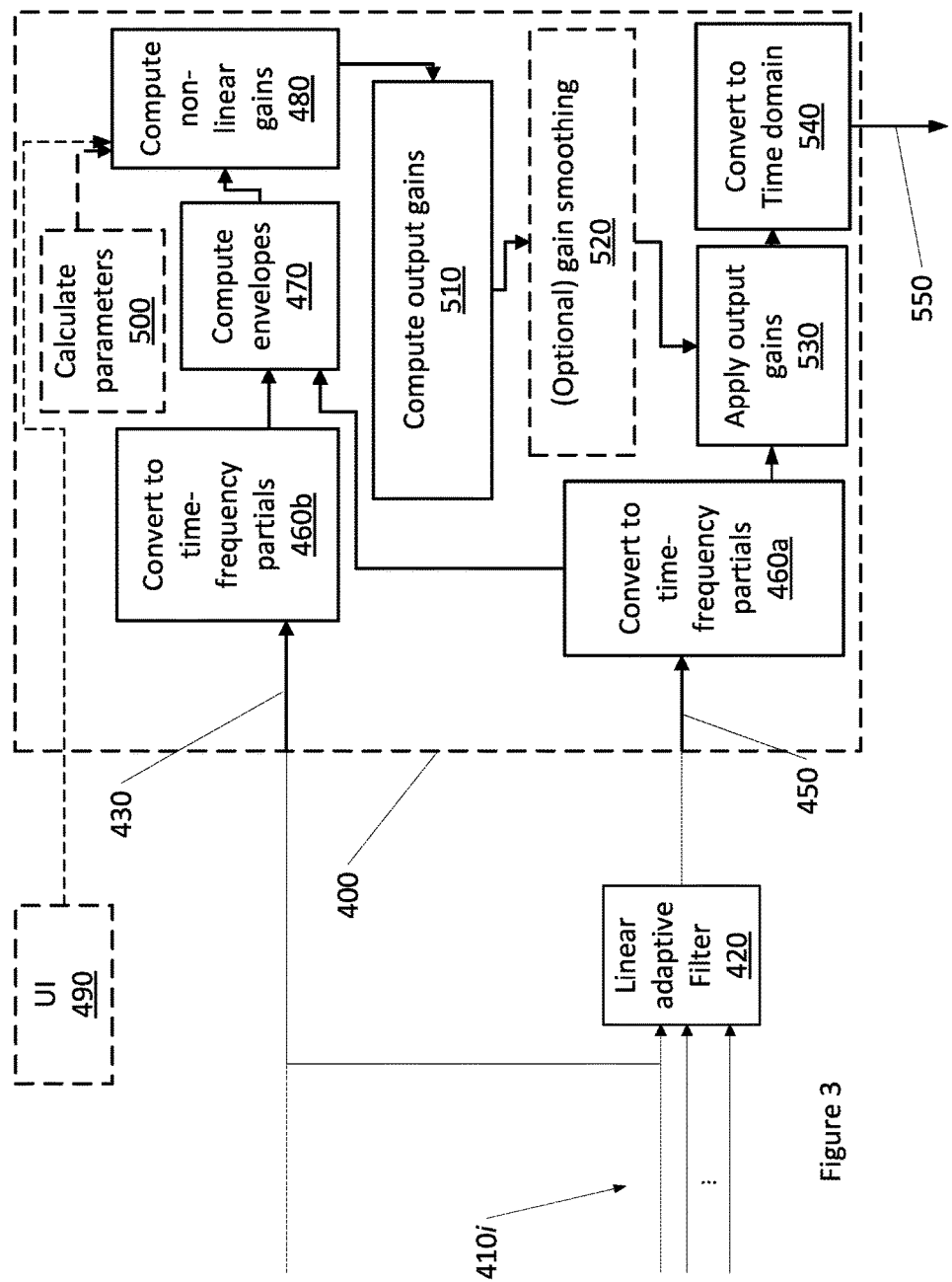
FIG. 3 is a functional block diagram of a method of applying a nonlinear adaptive filter, according to an example, in accordance with the presently disclosed subject matter.

FIG. 3 is a functional block diagram of a method of applying a nonlinear adaptive filter, according to an example, in accordance with the presently disclosed subject matter.

An example of a system 400 for filtering out unwanted components is described. Each of the separate blocks of said block diagram may be accomplished by a processor or a plurality of processors. In some examples a specific hardware module may be used to convert, compute and or apply data to a signal.

In some examples, an audio signal can be collected by a device, for example a device comprising inputs, outputs, processors and memory. The audio signal can be split such that one or more inputs $410i$ are processed, for example via a linear adaptive filter 420, and one reference input 430, can be selected manually, automatically and/or semi automatically by a user. In some examples, input $410i$ represents for example, $input_0$, $input_1$, and $iput_{N-1}$ for N inputs.

Said reference input can be determinable or chosen at random, or determinable or chosen based on a threshold value and/or other parameters. The reference input can be chosen from a plurality of the linear adaptive filter inputs, and, in some examples, from another source that is not necessarily an input to the adaptive linear filter.

An output 450 of said one or more remaining audio signals that were processed, e.g., a processed input, for example by way of a linear adaptive filter 420, can be inputted into a nonlinear adaptive filter module, as depicted by arrows 450. The nonlinear adaptive filter system, e.g., system 400, may be a cascade of modular components comprising hardware and/or software components.

Both said processed input 450 and said reference input 430, can be converted via one or more functions, for example a complex and/or other type of Fourier transform, into small partials in frequency and time (frequency band during a short time frame), for example: a time-sampled filter-bank as disclosed, or a short time DFT. In frequency band i, during time frame n, e.g., denoted, bin(i,n), where i denotes the frequency instance and n denotes the time instance. The steps performed herein are performed for every n. The functional conversion depicted by functional block 460a for channels 410 and functional block 460b for reference input 430.

In some examples, inputs may have already been converted via one or more methods into a time-frequency domain representation (e.g., time-frequency domain), from a time domain representation (e.g., time domain) prior to being inputted into nonlinear adaptive filter system 400. For example, when said linear adaptive filter is already operating in the time-frequency domain. That kind of linear chain implements a time to time-frequency domain converter, for example a time-sampled filter-bank or a short time DFT and vice versa, a time-frequency to time domain converter.

For every bin in the reference input 430 and processed output 450, the system can be configured to compute an envelope estimation, for example the amplitude spectrum of a short-time DFT or a band envelope follower, in a filter-bank.

Said system can compute the reference input as well as the processed input to respective output gains, G(i), as depicted, for example as functional block 470.

In some examples, G(i) is a ratio between the processed input envelope and the reference input envelope for each bin i. As described above, the letter i denotes the bin number with reference to bin(i,n), and it can be any number between 0 to K−1, where K is the total number of bins or frequency instances for every time instance.

In some examples, G(i) can be described in the calculation:

$$G(i) = \frac{\text{Processed Input envelope amplitude of bin } i}{\text{Reference input envelope amplitude of bin } i};$$

$$i = 0, \ldots, K-1$$

In some examples, G(i) can be calculated using a method to square the absolute value of complex values of the frequency bins of a short time DFT:

$$G(i) = \frac{|DFT\{\text{Processed input}\}(i)|^2}{|DFT\{\text{reference input}\}(i)|^2}$$

$$= \frac{(\text{Re}(DFT\{\text{Processed input}\}(i)))^2 + (\text{Im}(DFT\{\text{Processed input}\}(i)))^2}{(\text{Re}(DFT\{\text{Reference input}\}(i)))^2 + (\text{Im}(DFT\{\text{Reference input}\}(i)))^2}$$

In some examples, G(i) may contain a regularization factor to avoid division by zero. A regularization factor can be, for example, a number being added to the denominator in the ratio calculation and is substantially smaller than expected normal values of the denominator.

If the gain G(i) is equal or greater than 1 for a bin i, the processed input is maintained or amplified with respect to the reference input. In this case, the nonlinear filter is configured to do nothing to the portion of the processed input signal represented by bin i.

If the gain G(i) is smaller than 1 for a bin i, the linear adaptive filter may have caused a reduction at that bin i, indicating that bin i of one or more of the input signals of an adaptive linear filter included an unwanted component.

If the gain G(i) is smaller than 1 for a bin i, a nonlinear expansion function of G(i), $G_{NL}(i)$, can be computed as depicted by functional block 480. Said $G_{NL}(i)$ can be described for example as:

$$G_{NL}(i) = f(G(i)); i = 0, \ldots, K-1$$

Where $f(x)$ is a nonlinear function.

For example as described by the equation:

$$G_{NL}(i) = f(G(i)) = (G(i))^2; i = 0, \ldots, K-1$$

In some examples, any number of variations of nonlinear expansion functions may be employed at this step provided that said nonlinear functions are configured to amplify positive values.

An example, of said nonlinear function can be, in some examples, a polynomial of arbitrary powers such as described by the equation:

$$G_{NL}(i) = f(G(i)) = A*(G(i))^{3.5} + B*(G(i))^{4.5} i = 0, \ldots, K-1$$

Where coefficient A and B can be any real number.

Another possible addition to the computation of the nonlinear gain can be the use of a threshold:

$$G_{NL}(i) = f(G(i)) = \begin{cases} g(G(i)), & G(i) > \text{Threshold} \\ h(G(i)), & G(i) \le \text{Threshold} \end{cases};$$

$$i = 0, \ldots, K-1; g \ne h$$

In some examples functions g and h, e.g., functions that assemble the nonlinear function "f" as depicted mathematically, can be continuous functions. To keep the continuity of $f$ function as well, it is likely to choose g and h such that:

g(Threshold)=h(Threshold)

Thresholds described above can have a fixed value or an adaptive value determined externally or by the state of other parameters in the method. For example an external estimator of the noise or signal frequency profiles can be used to determine the threshold.

An example for the use of a threshold can be described by the following equation:

$$G_{NL}(i) = f(G(i)) = \begin{cases} G(i), & \frac{G(i)}{\text{Threshold}} > 1 \\ \text{Threshold} * \left(\frac{G(i)}{\text{Threshold}}\right)^\alpha, & \text{else} \end{cases}$$

$$i = 0, \ldots, K-1; \alpha > 1$$

Wherein i can have values of 0 to K−1; and α is a number greater than 1; and, this threshold equation can be useful because it simplifies the calculation of $G_{out}(i)$ in the next step.

In some examples, parameters 500 as provided by other modules of system 400 or outside of system 400, the user for example via a user interface, as depicted by block 490, the system, components within the system and or components from outside the system may be applied to computation of nonlinear gains.

After computing said nonlinear gains, the system can be configured to compute output gains to be applied to linear adaptive algorithm output bins, as depicted for example by functional block 510 The computing of output gains can be accomplished for example, by the equation:

$$G_{out}(i) = \frac{G_{NL}(i)}{G(i)}; i = 0, \ldots, K-1$$

In some examples, the nonlinear gain for bin i can be divided by G(i) to accommodate the fact that said linear adaptive algorithm already applied the gain G(i) once.

For example, for a particular nonlinear expansion function:

$$G_{NL}(i) = f(G(i)) = (G(i))^\alpha$$

Where α is a number greater than 1.
The output gain becomes:

$$G_{out}(i) = \frac{G_{NL}(i)}{G(i)} = \frac{(G(i))^\alpha}{G(i)} = (G(i))^{(\alpha-1)}; i = 0, \ldots, K-1$$

Using the threshold described above:

$$G_{out}(i) = \frac{G_{NL}(i)}{G(i)} = \begin{cases} 1, & \frac{G(i)}{\text{Threshold}} > 1 \\ \left(\frac{G(i)}{\text{Threshold}}\right)^{\alpha-1}, & \text{else} \end{cases}$$

$$i = 0, \ldots, K-1; \alpha > 1$$

A gradual change in gain value can be implemented when a transition from the state of "G(i)≤Threshold" to "G(i)>Threshold" takes place, and vice versa. This gradual change may be for example implemented prior-art soft-knee noise gating formulas In some examples, one or more optional steps can include applying a gain smoothing to each bin index, in said time domain and/or in the frequency domain. Said optional smoothing step can be as depicted by block 520.

In some examples, smoothing over time for time frame n, can be represented by the equations:

$$\text{state}(i,n) = \text{state}(i,n-1)*a + G_{out}(i,n)(1-a)$$

$$G_{out/smooth}(i,n) = \text{state}(i,n)$$

The smoothing coefficient, "a", may be set adaptively according to conditions on whether the signal in the band is rising or falling.

Output gains, $G_{out}(i)$, or in some examples, smoothed output gains, $G_{out/smooth}(i)$, can be applied to all bins of processed input, e.g., as described above, as depicted by functional block 530.

After applying said output gains, the signal may be converted back to a time domain, as depicted for example by functional block 540. Said conversion for outputting a processed signal, can include instances wherein said processed signal 550 may have unwanted components removed.

Said conversion back to the time domain may be accomplished via one or more methods, for| example by inverse FFT. Said inverse FFT can be configured to be used with or without time overlap and/or by summing the bands of a filter-bank.

Figure 4A:
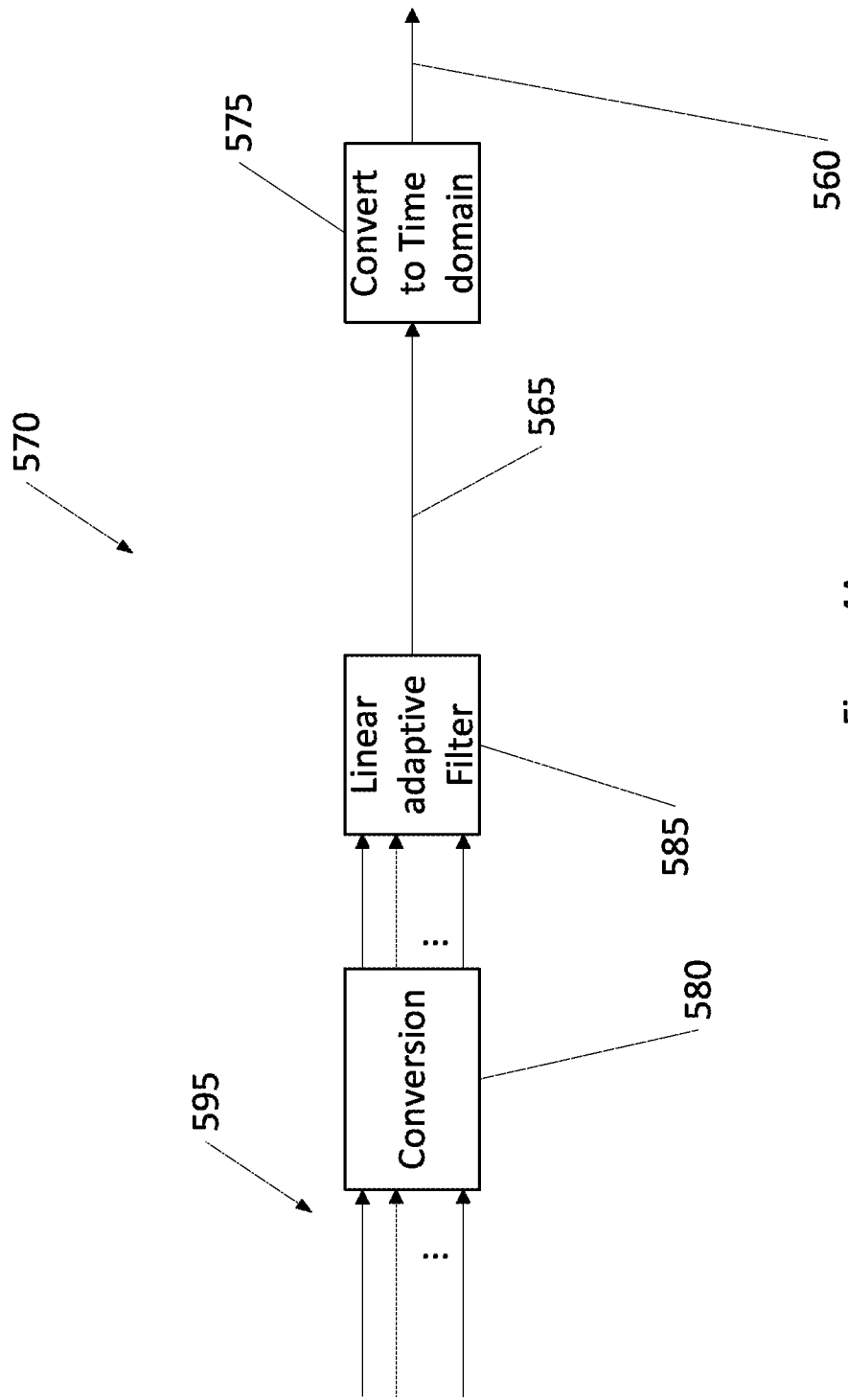
FIG. 4A is a functional block diagram of a method of applying an adaptive filter, according to an example, in accordance with the presently disclosed subject matter.

FIG. 4A is a functional block diagram of a method of applying an adaptive filter, according to an example.

System 400, as described above, can be inserted for example between the linear adaptive filter module 585 and the conversion to time domain module 575, described below. System 400 can use input 565, described below, as one of its inputs. System 400 may use linear output 565 of a filtering system 570 as an input, wherein signals, for example audio signals, are converted to time-frequency partials (bins), as depicted in functional block 580 prior to running through a linear adaptive filter, 585.

In some examples, linear output 565 from linear adapter 585 can be presented in a time-frequency domain. Linear output 560 can be representable in the time domain.

Filtering system 570 may, after running one or more inputs 595—e.g. input$_0$, and input$_1$ through inputs$_{N-1}$, for N inputs, through linear adaptive filter 585, convert a filtered linear output 565 back to a time domain representation, for example as depicted in functional block 575. The conversion would result in linear output 560 presented in the time domain.

Figure 4B:
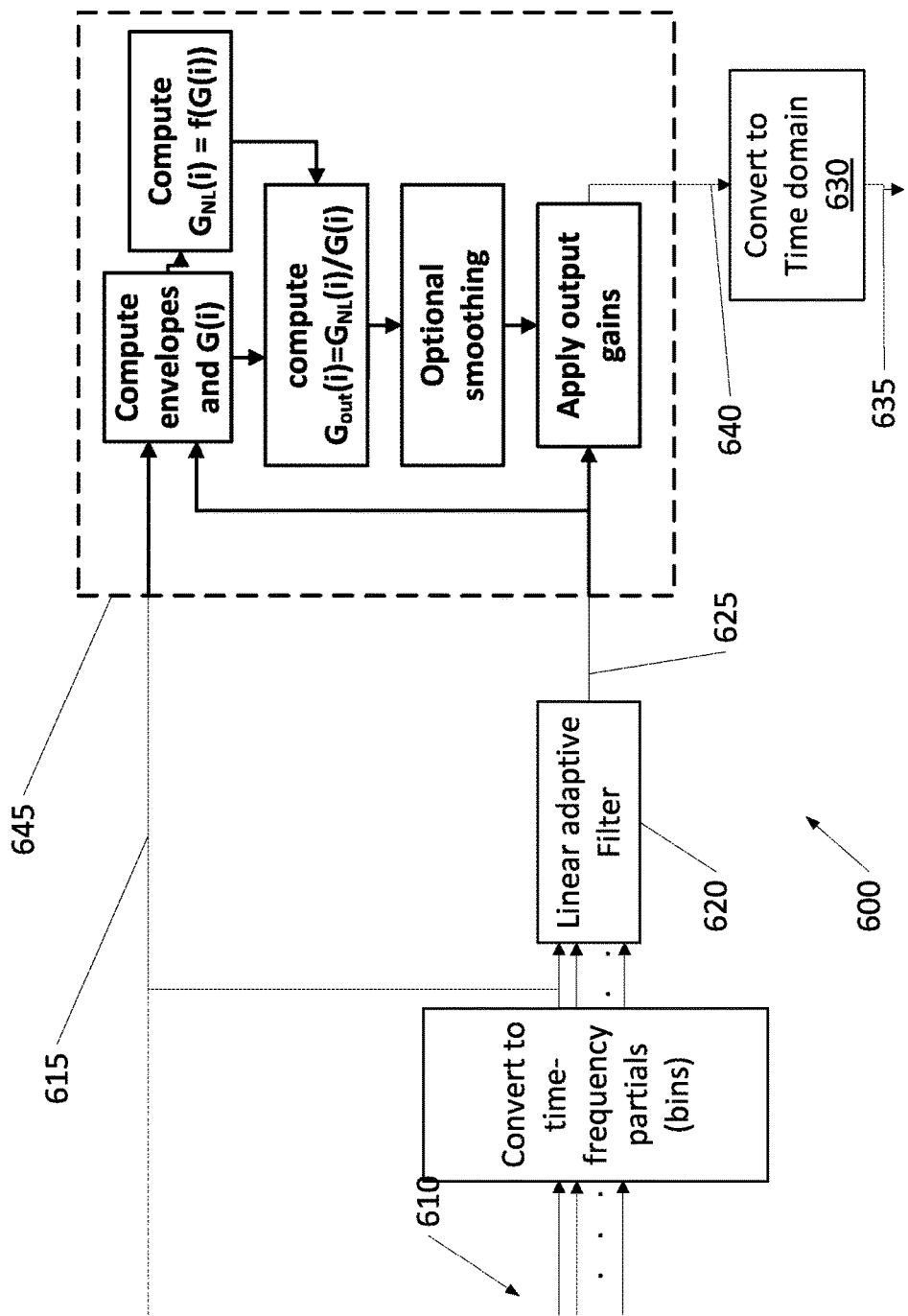
FIG. 4B is a functional block diagram of a method of applying a nonlinear adaptive filter, according to an example, in accordance with the presently disclosed subject matter.

FIG. 4B is a functional block diagram of a method of applying a nonlinear adaptive filter, according to an example, in accordance with the presently disclosed subject matter.

System 600 depicted herein, describes in some examples, the linear adaptive filter coupled to a nonlinear adaptive filer system described above, for example in FIG. 4A in conjunction with the nonlinear adaptive filter system described above with reference to FIG. 3.

Said system maybe more, less or similarly efficient to systems described above. Inputs 610 can be audio signals,—e.g. input$_0$, and input$_1$ through inputs$_{N-1}$, for N inputs. Inputs 610 can be converted to time-frequency partials prior to a linear adaptive filter, for example as depicted in functional block 580 described above.

The other components of system 600 are as, for example, described above with reference to FIG. 3 except for the differences, for example, as described herein.

For example linear adaptive filter 620 can output a linear output 625, the linear output 625 being represented within the time-frequency domain. Linear output 625 can be the processed input for the nonlinear adaptive filter 645. Input 615 can be a reference input, for example as described above.

Channels representing said processed input and said reference input, as described above with reference to FIG. 3 need not be converted to time-frequency partials after running through the linear adaptive filter.

The output 640 of this system, for example a filtered audio signal where unwanted components, frequencies, and or other unwanted parts may be fully, partially or somewhat removed from an input audio signal, may be outputted in the time-frequency domain. A conversion module, for example as depicted as functional block 630, may be applied to convert output 640 into a time domain format, further outputting output 635 in the time domain.

Figure 5A:
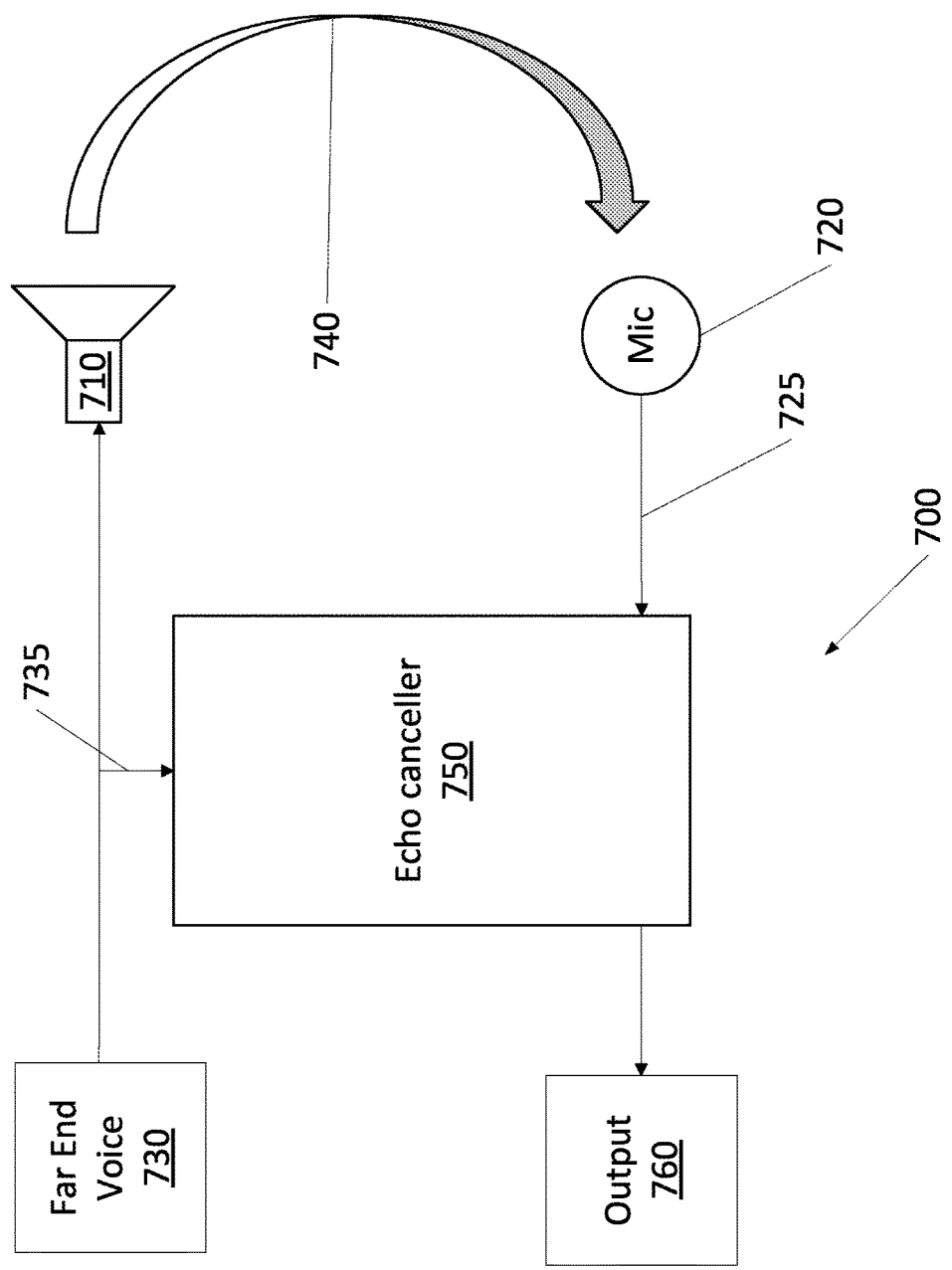
FIG. 5A is a functional block representation of an echo cancellation system, according to an example, in accordance with the presently disclosed subject matter.

FIG. 5A is a functional block representation of an echo cancellation system, according to an example, in accordance with the presently disclosed subject matter.

An echo cancellation system 700 and/or acoustic echo cancellation system (AEC) can be used to remove unwanted components of a signal. In some examples an echo cancellation system may be used in instance of hands-free communication system where there may be a coupling between sounds, e.g., a far end voice 730, emitted from a loudspeaker 710 and a recorded audio signal from a microphone 720. In some examples one or more signals from far end voice 730 can be inputted into an echo canceller 750. In some examples one or more signals 725 from microphone 720 can be inputted into echo canceller 750.

This coupling or echo leak 740 can impede clear communications, for example. The echo leak 740 and the near end voice that is sensed by microphone 720 can be combined to form an input with unwanted components, e.g., an echo component.

In some examples, said far end voice 730 has more than one channel, and one or more of said far end channels are emitted from one or more loudspeakers 710.

In some examples, System 700 can output an audio signal 760, wherein some or all of said echo has been removed from the input with unwanted components, described, for example, above.

Figure 5B:
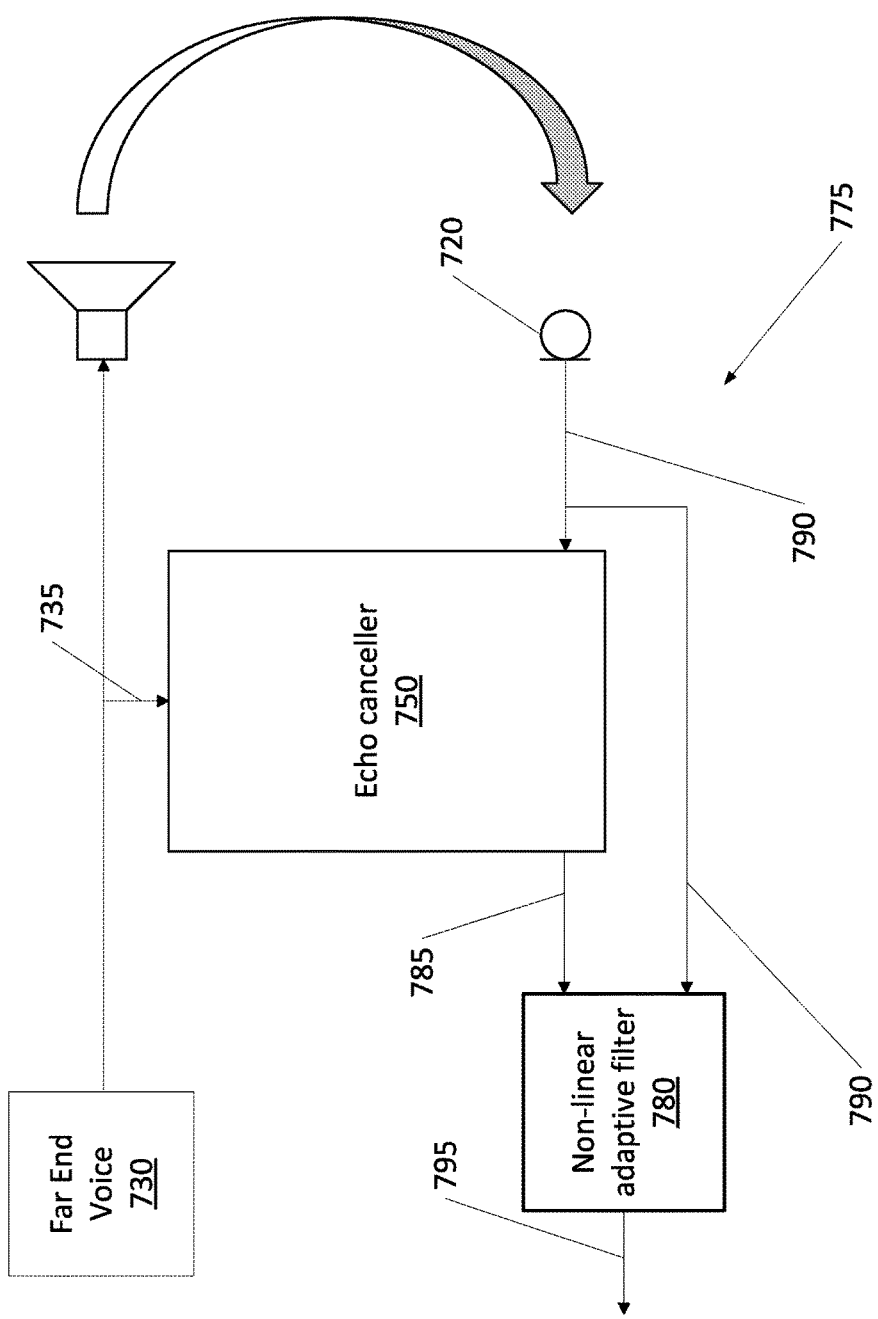
FIG. 5B is a functional block representation of an echo cancellation system comprising a nonlinear adaptive filter, according to an example, in accordance with the presently disclosed subject matter.

FIG. 5B is a functional block representation of an echo cancellation system comprising a nonlinear adaptive filter, according to an example, in accordance with the presently disclosed subject matter.

Components in the figure are as described above with reference to FIG. 5A except for the differences. In some examples, an echo cancellation system 775 can include a nonlinear adaptive filter 780 in a cascade to echo canceller 750.

A processed input, in some examples, similar to a processed input described above can be introduced into a nonlinear adaptive filter, as depicted by functional block 780. The processed input 785 can, in some examples, be the output of an echo canceller 750. In some examples, output of an echo canceller 750 may include input 790 with reduction or cancellation of unwanted components, e.g. echo leaks, as described above. Nonlinear adaptive filter 780 may also use as an input a reference input 790. In some examples reference input 790 can be echo leak 740 and near end voice that is sensed by microphone 720, for example, as described above.

An output 795 may include an audio signal wherein unwanted components have been removed from the processed input signal 785.

FIG. 6A is a functional block representation of a beam forming system, according to an example, in accordance with the presently disclosed subject matter.

Beamforming is a method for processing signals such as acoustic waves. Beamforming can have applications in acoustics, sonar, wireless communications, medicine and radio astronomy. Also known as spatial filtering, the method of beamforming processes signals by combining one or more elements of a phased array, the combination is configured such that some signals at particular angles may experience constructive interference while others signals may experience destructive interference.

Beamformer 830 may use as inputs 825, e.g., $input_0$, $input_1$, $input_{N-1}$ from one or more sources. $Input_0$, in some examples, can be derived from a microphone $820_0$.

Output of a beamformer 830, a voice of a speaker for example, may reduce some or all of the unwanted signal, e.g., ambient noise.

Figure 6B:
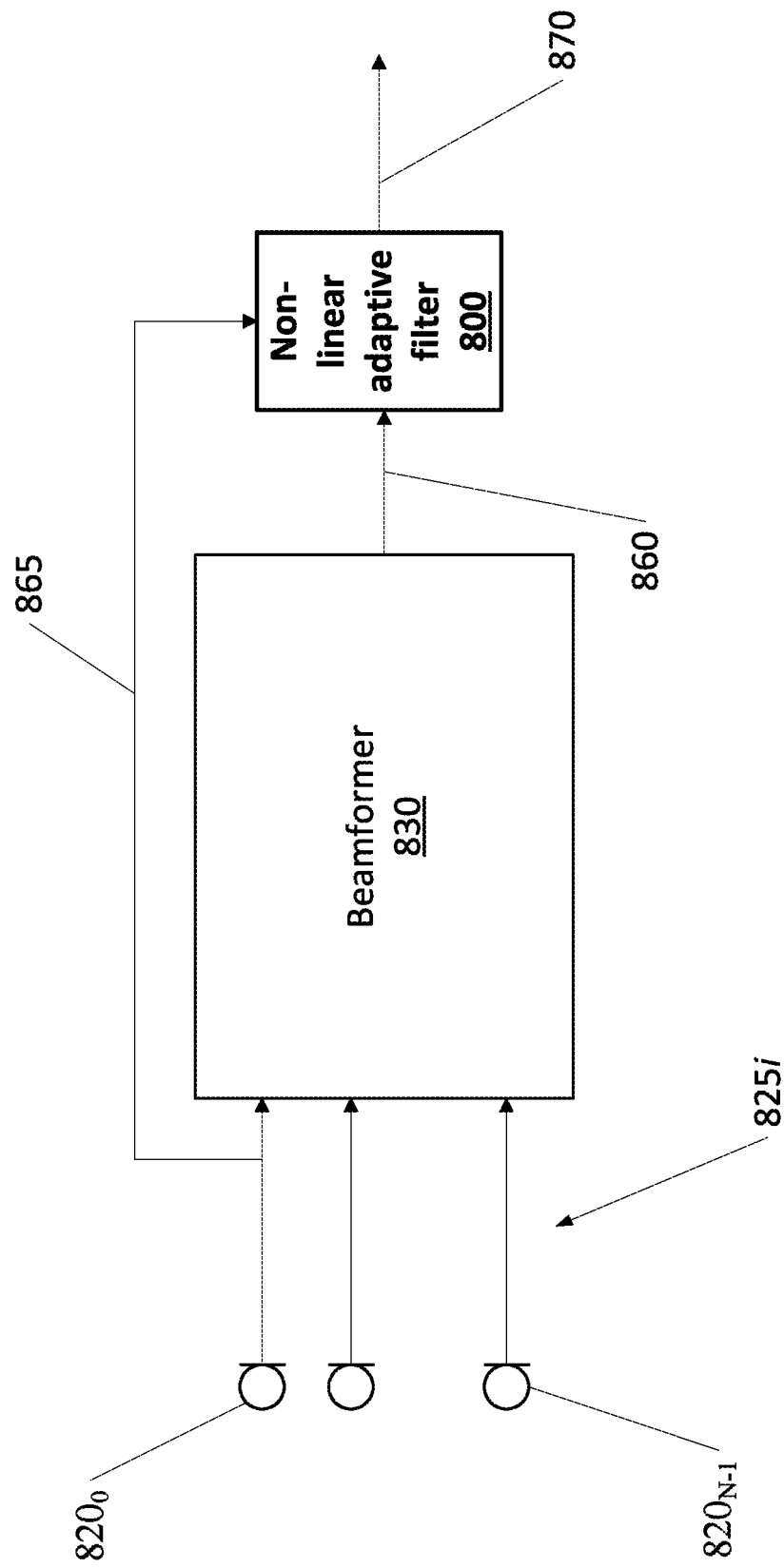
FIG. 6B is a functional block representation of a beam forming system, according to an example, in accordance with the presently disclosed subject matter; and, FIG. 7 is a functional block representation of a filter within a dereverberation system, according to an example, in accordance with the presently disclosed subject matter.

FIG. 6B is a functional block representation of a beam forming system, according to an example, in accordance with the presently disclosed subject matter.

FIG. 6B shows an example for connecting the nonlinear adaptive filter 800 in a cascade to a beamformer chain 810, for example in FIG. 6A, with differences noted.

The application may be similar to the application on nonlinear filters described above. A processed input 860 to nonlinear adaptive filter 800 can be an output of a beamformer 830.

A reference input, 865 for nonlinear adaptive filter 800, can be for example, $input_0$, where this input is derived, in some examples, from a microphone $820_0$. In some examples, a high quality, or a best quality, microphone can be selected as reference input. A final output 870 may be filtered from more unwanted components than output signal 860, e.g., a processed input for non linear adaptive filter 800.

Figure 7:
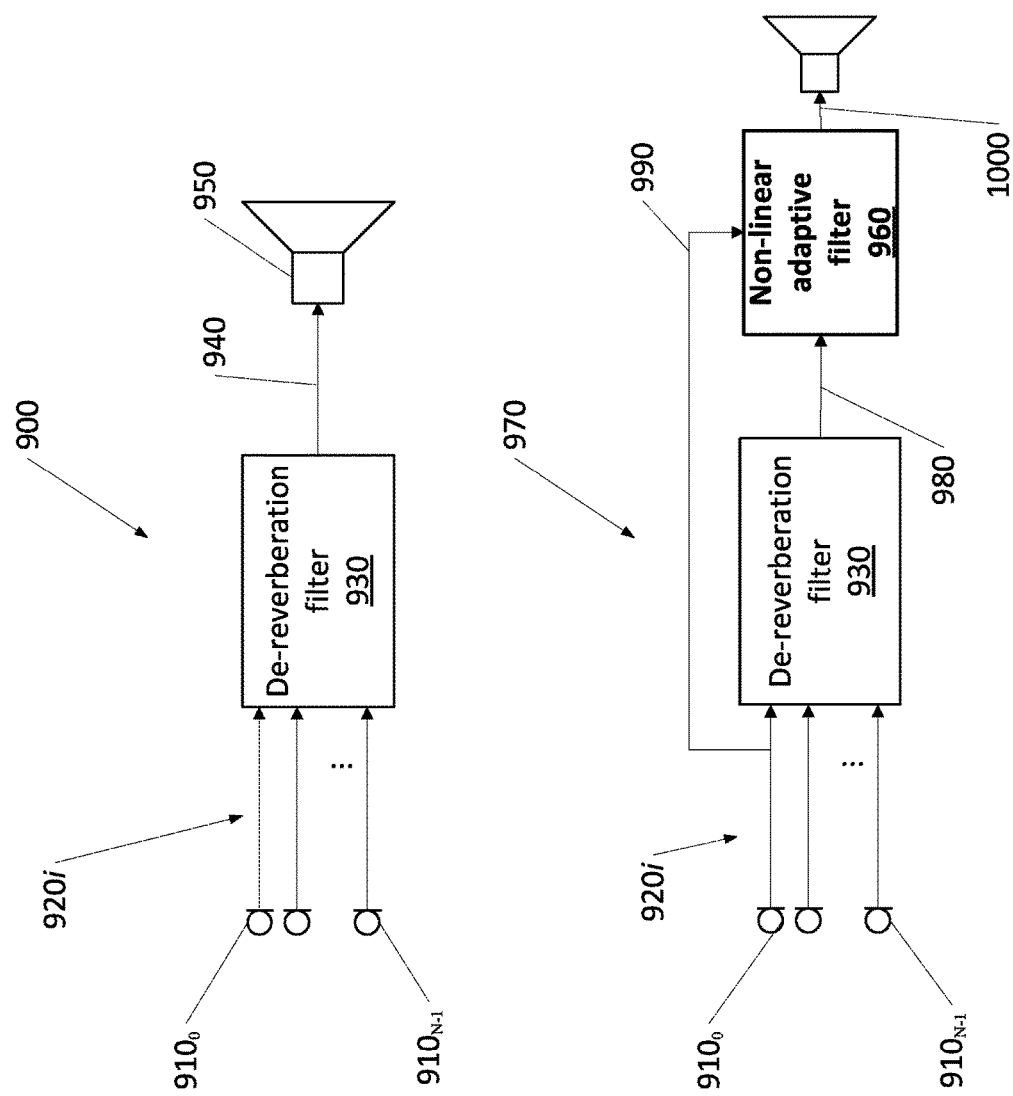

FIG. 7 is a functional block representation of a filter within a dereverberation system, according to an example, in accordance with the presently disclosed subject matter.

Dereverberation, audio deconvoluting, and or reverberation reduction, can be used in correcting for unwanted components in a signal. Reverberation is the process of multipath propagation of an acoustic signal from its source to one or more microphones, dereverberation removes errors and/or unwanted components that result from said multipath of the signal.

In some dereverberation systems comprising a dereverberation cascade 900, one or more microphone 910*i* relaying one or more signals, e.g., inputs 920*i*, for example, $input_0$, $input_1$, $input_{N-1}$, can pass inputs 920*i*, through a dereverberation filter 930, and output a signal 940, in some examples, with less acoustic reverberations, to a speaker 950.

In some examples, a nonlinear adaptive filter 960 can be included in a cascade 970 to a single or to a multi-channel de-reverberator linear chain. A processed input 980 to nonlinear adaptive filter 960 can be, for example, the output of the de-reverberator filter, for example dereverberation filter 930.

This process is, for example, as described above with reference to the figures above. A reference input 990 to nonlinear adaptive filter 960 can be for example one of the inputs 920 received by N microphones 910*i*. A filtered output 1000 wherein some or all of unwanted components have been removed can result from dereverberation cascade 970.

It is to be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A device for processing audio signals for suppression of unwanted components comprising a processor operatively coupled to a memory, wherein said processor comprises:
    a first gain producing module configured to:
        receive a plurality of audio signal inputs including at least a first input being a reference input, and a second input being a processed input, wherein said processed input comprises an audio signal after having undergone a first reduction process to remove unwanted components,
        estimate envelope values for the first and second inputs at a plurality of time and frequency instances, and
        compute, for each said time and frequency instance, a first gain in accordance with a ratio between the estimated envelope values for the first and second inputs;
    a non-linear processing module configured to compute, for each said time and frequency instance, a second gain by applying a nonlinear process to said first gain;
    a final gain producing module configured to compute, for each said time and frequency instance, an output gain as a ratio between said second gain and said first gain; and,
    a filtration module configured to apply, for each said time and frequency instance, said output gain to the second input thereby producing a filtered output being an audio signal with unwanted components suppressed.

2. The device of claim 1, wherein said processed input and said reference input are in a time domain representation and said processor is configured to convert said processed input and said reference input into a time-frequency representation prior to said estimation of envelope values, and to convert said filtered output from the time-frequency representation into the time domain representation.

3. The device of claim 1, wherein said processed input and said reference input are converted into a time-frequency representation prior to being received by the processor.

4. The device of claim 1, wherein said processed input is a result of a noise suppression process that was applied to an audio signal.

5. The device of claim 1, wherein said processed input is a result of a cancellation process of unwanted parts on an audio signal.

6. The device of claim 1, wherein said ratio between said estimated envelope values is computed using a regularization factor.

7. The device of claim 1, wherein said nonlinear process is an expansion operation.

8. The device of claim 1, wherein said second gain is computed as an expansion of said first gain if said first gain is less than 1, and as equal to said first gain if said first gain is greater or equal to 1.

9. The device of claim 1 wherein said first gain is computed as proportional to the ratio of the estimated envelope value of the processed input to the estimated envelope value of the reference input, if said estimated envelope value of the processed input is greater than said estimated envelope value of the reference input; otherwise the first gain is set to one.

10. The device of claim 1 wherein said audio signals are digitally sampled signals.

11. The device of claim 1 wherein said output gain is smoothed in time domain or in frequency domain or in both time and frequency domains.

12. The device of claim 1 wherein the processor is configured to receive additional parameters for use in said nonlinear processing.

13. The device of claim 12, wherein the processor is configured to receive said additional parameters externally.

14. The device of claim 12, wherein the processor is configured to receive said additional parameters from a user interface.

15. The device of claim 12, wherein the processor is configured to receive said additional parameters from an additional module configured to calculate said parameters.

16. The device of claim 1, wherein said processor further comprises a filter-bank module configured for decomposing said processed input and said reference input into frequency bands, and wherein said frequency instances for said processed signal are taken as the plurality of outputs of frequency bands of said filter-bank applied to said first input signal, and wherein said frequency instances for said reference signal are taken as the plurality of outputs of frequency bands of said filter-bank applied to said second input signal.

17. The device of claim 1, wherein said reference input is a near-end audio input signal of an echo canceller, and said processed input is an audio output of said echo canceller.

18. The device of claim 1, wherein said reference input is an audio input to a beam former and said processed input is an output of said beam former.

19. The device of claim 1, wherein said reference input is an audio input to a de-reverberation module and said processed input is an output of said de-reverberation module.

20. A method of suppressing unwanted components in an audio signal, the method implemented on a processor operatively coupled to a memory, the method comprising:
receiving a plurality of audio signal inputs including at least a first input being a reference input, and a second input being a processed input, wherein said processed input comprises an audio signal after having undergone a first reduction process to remove unwanted components;
estimating envelope values for the first and second inputs at a plurality of time and frequency instances;
computing, for each said time and frequency instance, a first gain in accordance with a ratio between the estimated envelope values for the first and second inputs;
computing, for each said time and frequency instance, a second gain by applying a nonlinear process to said first gain;
computing, for each said time and frequency instance, an output gain as a ratio between said second gain and said first gain; and,
applying, for each said time and frequency instance, said output gain to the second input thereby producing a filtered output being an audio signal with unwanted components suppressed.

21. The method of claim 20, wherein said processed input and said reference input are in a time domain representation and said processor is configured to convert said processed input and said reference input into a time-frequency representation prior to said estimation of envelope values, and to convert said filtered output from the time-frequency representation into the time domain representation.

22. The method of claim 20, wherein said processed input and said reference input are converted into a time-frequency representation prior to being received by the processor.

23. The method of claim 20, wherein the processed input results from a noise suppression process that was applied to an audio signal.

24. The method of claim 20, wherein the processed input results from a cancellation process of unwanted parts on an audio signal.

25. The method of claim 20, wherein computing the ratio between estimated envelope values comprises applying a regularization factor.

26. The method of claim 20, wherein said nonlinear process applied on said first gain is an expansion operation.

27. The method of claim 20 wherein the second gain is computed as an expansion of said first gain if said first gain is less than 1, and said second gain is computed as equal to said first gain if said first gain is greater or equal to 1.

28. The method of claim 20, wherein the first gain is computed to be proportional to the ratio of the estimated envelope value of the processed input to the estimated envelope value of the reference input, if said estimated envelope value of the processed input is greater than said estimated envelope value of the reference input; otherwise the first gain is set to one.

29. The method of claim 20, wherein said audio signals are digitally sampled signals.

30. The method of claim 20, wherein the output gain is smoothed in time domain or in frequency domain or in both time and frequency domains.

31. The method of claim 20, wherein applying a nonlinear processing comprises receiving additional parameters for use in said nonlinear processing.

32. The method of claim 31, wherein said parameters are received externally.

33. The method of claim 31, wherein said parameters are received from a user interface.

34. The method of claim 31, wherein said parameters are received from an additional module configured to calculate said parameters with relation to the said method.

35. The method of claim 20, further comprising decomposing said processed input and said reference input into frequency bands, and wherein said frequency instances for said processed signal are taken as the plurality of outputs of frequency bands of said filter-bank applied to said first input signal, and wherein said frequency instances for said reference signal are taken as the plurality of outputs of frequency bands of said filter-bank applied to said second input signal.

36. The method of claim 20, wherein said reference input is a near-end audio input signal of an echo canceller, and said processed input is an audio output of said echo canceller.

37. The method of claim 20, wherein said reference input is from one or more audio inputs to a beam former and said processed input is one or more outputs of said beam former.

38. The method of claim 20, wherein said reference input is from one or more audio inputs to a de-reverberation module and said processed input is the output of said de-reverberation module.

39. A non-transitory computer-readable medium storing computer-readable instructions that when executed by a processor cause the processor to perform a method comprising:
receiving a plurality of audio signal inputs including at least a first input being a reference input, and a second input being a processed input, wherein said processed input comprises an audio signal after having undergone a first reduction process to remove unwanted components;
estimating envelope values for the first and second inputs at a plurality of time and frequency instances;
computing, for each said time and frequency instance, a first gain in accordance with a ratio between the estimated envelope values for the first and second inputs;
computing, for each said time and frequency instance, a second gain by applying a nonlinear process to said first gain;
computing, for each said time and frequency instance, an output gain as a ratio between said second gain and said first gain; and,
applying, for each said time and frequency instance, said output gain to the second input thereby producing a filtered output being an audio signal with unwanted components suppressed.

40. The medium of claim 39, wherein said method comprises converting said processed input and said reference input from a time domain representation into a time-frequency representation prior to said estimation of envelope values, and converting said filtered output from the time-frequency representation into the time domain representation.

41. The medium of claim 39, wherein said processed input and said reference input are converted into a time-frequency representation prior to being received.

42. The medium of claim 39, wherein the processed input is a result of a noise suppression process that was applied to an audio signal.

43. The medium of claim 39, wherein the processed input is a result of a cancellation process of unwanted parts on an audio signal.

44. The medium of claim 39, wherein said ratio between the estimated envelope values is computed using a regularization factor.

45. The medium of claim 39, wherein said nonlinear process is an expansion operation.

46. The medium of claim 39, wherein said second gain is computed as an expansion of said first gain if said first gain is less than 1, and computed as equal to said first gain if said first gain is greater or equal to 1.

47. The medium of claim 39, wherein said first gain is computed as proportional to the ratio of the estimated envelope value of the processed input to the estimated envelope value of the reference input, if said estimated envelope value of the processed input is greater than said estimated envelope value of the reference input; otherwise the first gain is set to one.

48. The medium of claim 39, wherein said audio signals are digitally sampled signals.

49. The medium of claim 39, wherein said output gain is smoothed in time domain or in frequency domain or in both time and frequency domains.

50. The medium of claim 39, wherein said method includes receiving additional parameters for use in said nonlinear processing.

51. The medium of claim 50, wherein said parameters are received externally.

52. The medium of claim 50, wherein said parameters are received from a user interface.

53. The medium of claim 50, wherein said parameters are received from a module configured to calculate said parameters.

54. The medium of claim 39, wherein said method includes decomposing said processed input and said reference input into frequency bands, and wherein said frequency instances for said processed signal are taken as the plurality of outputs of frequency bands of said filter-bank applied to said first input signal, and wherein said frequency instances for said reference signal are taken as the plurality of outputs of frequency bands of said filter-bank applied to said second input signal.

55. The medium of claim 39, wherein said reference input is a near-end audio input signal of an echo canceller, and said processed input is an audio output of said echo canceller.

56. The medium of claim 39, wherein said reference input is comprised of one or more audio inputs to a beam former and said processed input is the output of said beam former.

57. The medium of claim 39, wherein said reference input is comprised of one of the audio inputs to a de-reverberation module and said processed input is the output of said de-reverberation module.

\* \* \* \* \*